(12) United States Patent　　(10) Patent No.: US 8,731,176 B2
Kawashima et al.　　(45) Date of Patent: May 20, 2014

(54) OPERATOR EVALUATION SUPPORT DEVICE AND OPERATOR EVALUATION SUPPORT METHOD

(71) Applicant: Fujitsu Limited, Kawasaki (JP)

(72) Inventors: Naoto Kawashima, Yokohama (JP); Naoto Matsudaira, Yokohama (JP); Yuusuke Tounai, Nishi (JP); Hiroshi Yoshida, Yokohama (JP); Shingo Hirono, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 14/017,890

(22) Filed: Sep. 4, 2013

(65) Prior Publication Data

US 2014/0029742 A1　Jan. 30, 2014

Related U.S. Application Data

(63) Continuation of application No. PCT/JP2011/056403, filed on Mar. 17, 2011.

(51) Int. Cl.
*H04M 3/00* (2006.01)
*H04M 5/00* (2006.01)

(52) U.S. Cl.
USPC ............ 379/265.07; 379/265.01; 379/265.03; 379/265.06

(58) Field of Classification Search
USPC ............ 379/265.07, 265.06, 265.03, 265.01, 379/265.11, 265.05, 265.02
See application file for complete search history.

(56) References Cited

U.S. PATENT DOCUMENTS 7,728,870 B2 * 6/2010 Rudnik et al. ................ 348/143
8,094,790 B2 * 1/2012 Conway et al. ............ 379/88.16

FOREIGN PATENT DOCUMENTS

| JP | 2005-252845 | 9/2005 |
| JP | 2006-185319 | 7/2006 |
| JP | 2007-4001 | 1/2007 |
| JP | 2007-288242 | 11/2007 |

OTHER PUBLICATIONS

Patent Abstracts of Japan, Publication No. 2007-288242, Published Nov. 1, 2007.
Patent Abstracts of Japan, Publication No. 2005-252845, Published Sep. 15, 2005.
Patent Abstracts of Japan, Publication No. 2007-004001, Published Jan. 11, 2007.
Patent Abstracts of Japan, Publication No. 2006-185319, Published Jul. 13, 2006.
International Search Report of PCT/JP2011/056403 mailed May 31, 2011.

* cited by examiner

*Primary Examiner* — Thjuan K Addy
(74) *Attorney, Agent, or Firm* — Staas & Halsey LLP

(57) ABSTRACT

An operator evaluation support device includes a speech recording unit configured to record speech times of a customer and an operator during a telephone call; a superposition identifying unit configured to refer to the speech recording unit and identify a superposition speech, which is a speech of the operator that has started during a speech of the customer; a problematic superposition identifying unit configured to identify a problematic superposition speech among the superposition speeches, by comparing a sound quality of a speech of the customer that has started after the superposition speech with a standard sound quality; a call information creating unit configured to refer to the speech recording unit and create telephone call information indicating the identified problematic superposition speech during the telephone call; and a sending unit configured to send the created telephone call information to an administrator terminal used by an administrator evaluating the operator.

12 Claims, 25 Drawing Sheets

FIG.5

| CUSTOMER ID | TELEPHONE NUMBER | CUSTOMER | ADDRESS | PURCHASED PRODUCT MODEL NUMBER | PURCHASED STORE |
|---|---|---|---|---|---|
| 986569 | 0441234567 | HANAKO SUZUKI | TAMA-KU, KAWASAKI-SHI, KANAGAWA-KEN・・・・・ | VS78359 | TAMA STORE |
| 8645525 | 0331234567 | JIRO FUJI | SHIBUYA-KU, TOKYO・・・・・ | GF0976 | SHIBUYA STORE |
| 4237647 | 0451234567 | TARO YAMADA | YOKOHAMA-SHI, KANAGAWA-KEN・・・・・ | KJ98746 | YOKOHAMA STORE |
| 376495 | 0339876543 | SATO | NERIMA-KU, TOKYO・・・・・ | KK076554 | NERIMA STORE |

FIG.6

| CALL_ID | TIME | EVENT | AVERAGE-VOLUME-IN-SPEECH |
|---|---|---|---|
| 7840128 | 10:00:00 | OPERATOR SPEECH START | - |
| 7840128 | 10:00:08 | OPERATOR SPEECH END | - |
| 7840128 | 10:00:08 | CUSTOMER SPEECH START | - |
| 7840128 | 10:00:10 | CUSTOMER SPEECH END | 58 |
| 7840128 | 10:00:15 | OPERATOR SPEECH START | - |
| 7840128 | 10:00:17 | OPERATOR SPEECH END | - |
| 7840128 | 10:00:20 | CUSTOMER SPEECH START | - |
| 7840128 | 10:00:31 | CUSTOMER SPEECH END | 59 |
| 7840128 | 10:00:33 | OPERATOR SPEECH START | - |
| 7840128 | 10:00:42 | CUSTOMER SPEECH START | - |
| 7840128 | 10:00:48 | OPERATOR SPEECH END | - |
| 7840128 | 10:00:50 | OPERATOR SPEECH START | - |

| CALL_ID | TIME | EVENT | AVERAGE-VOLUME-IN-SPEECH |
|---|---|---|---|
| 7840128 | 10:00:53 | CUSTOMER SPEECH END | 58 |
| 7840128 | 10:01:04 | OPERATOR SPEECH END | - |
| 7840128 | 10:01:04 | CUSTOMER SPEECH START | - |
| 7840128 | 10:01:06 | CUSTOMER SPEECH END | 61 |
| 7840128 | 10:01:10 | OPERATOR SPEECH START | - |
| 7840128 | 10:01:18 | OPERATOR SPEECH END | - |
| 7840128 | 10:01:19 | CUSTOMER SPEECH START | - |
| 7840128 | 10:01:23 | OPERATOR SPEECH START | - |
| 7840128 | 10:01:26 | CUSTOMER SPEECH END | 58 |
| 7840128 | 10:01:30 | OPERATOR SPEECH END | - |
| 7840128 | 10:01:32 | CUSTOMER SPEECH START | - |
| 7840128 | 10:01:34 | CUSTOMER SPEECH END | 58 |

| CALL ID | INQUIRY DATE | INQUIRY TIME | INQUIRY CUSTOMER | ATTENDING OPERATOR | VOICE FILE (ALL) |
|---|---|---|---|---|---|
| 7840128 | 2010/8/31 | 10:00 | 986569 | 2000 | 10080110232000.wav |
| 7840129 | 2010/9/1 | 16:34 | 8645525 | 2010 | 10090116342010.wav |
| 7840130 | 2010/9/3 | 17:32 | 4237647 | 1009 | 10090317321009.wav |
| 7840131 | 2010/9/3 | 12:34 | 376495 | 3000 | 10090312343000.wav |

| OPERATOR ID | OPERATOR NAME | STATUS |
|---|---|---|
| 2000 | HANAKO TANAKA | ATTENDING TO A CALL |
| 2010 | ○○○○ | AVAILABLE |
| 2020 | × × × × | ATTENDING TO A CALL |
| 2030 | △△△△ | AVAILABLE |

FIG.9

| CALL ID | VOICE FILE NAME | LEFT CHANNEL SPEAKER | RIGHT CHANNEL SPEAKER |
|---|---|---|---|
| 7840128 | 100801102320000.wav | OPERATOR | CUSTOMER |
| 7840129 | 100901163420010.wav | OPERATOR | CUSTOMER |
| 7840130 | 100903173210009.wav | OPERATOR | CUSTOMER |
| 7840131 | 100903123430000.wav | OPERATOR | CUSTOMER |

FIG.10

| ONE SUPERPOSITION TIME (SECONDS) | EVALUATION POINT |
|---|---|
| 0-2 | -10 |
| 2-5 | -20 |
| 5-10 | -30 |
| GREATER THAN OR EQUAL TO 10 | -40 |

FIG.11

| PROBLEMATIC SUPERPOSITION FREQUENCY | EVALUATION POINT |
|---|---|
| 1 | -10 |
| 2 | -20 |
| 3 | -30 |
| GREATER THAN OR EQUAL TO 3 | -40 |

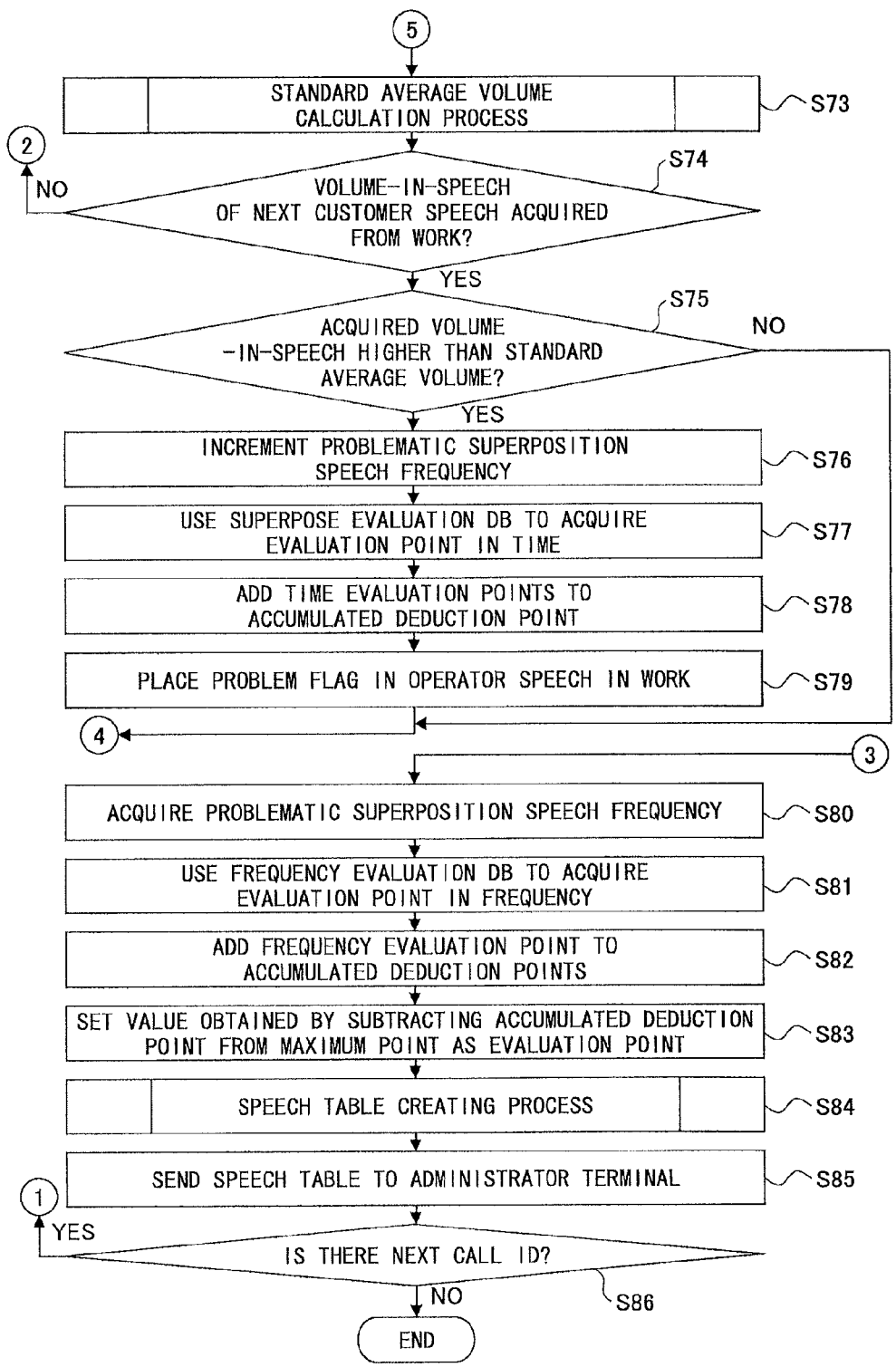

FIG.17

PROCESS RANGE SELECTION SCREEN
PLEASE SELECT THE RANGE OF THE CALL TO BE
AN OBJECT OF CREATING A TABLE THIS TIME.

◎ SPECIFY CALL ID
CALL ID _____

○ SPECIFY CONDITION
DATE RANGE _____ ~ _____
OPERATOR ID _____

[ EXECUTE ]     [ CANCEL ]

FIG.18

| SPEECH START | SPEECH END | SPEAKER | AVERAGE-VOLUME-IN-SPEECH | PROBLEM FLAG |
|---|---|---|---|---|
| 10:00:00 | 10:00:08 | OPERATOR | — | |
| 10:00:08 | 10:00:10 | CUSTOMER | 58 | |
| 10:00:15 | 10:00:17 | OPERATOR | — | |
| 10:00:20 | 10:00:31 | CUSTOMER | 59 | |
| 10:00:33 | 10:00:48 | OPERATOR | — | |
| 10:00:42 | 10:00:53 | CUSTOMER | 58 | |
| 10:00:50 | 10:01:04 | OPERATOR | — | ON |
| 10:01:04 | 10:01:06 | CUSTOMER | 61 | |
| 10:01:10 | 10:01:18 | OPERATOR | — | |
| 10:01:19 | 10:01:26 | CUSTOMER | 58 | |
| 10:01:23 | 10:01:30 | OPERATOR | — | |
| 10:01:32 | 10:01:34 | CUSTOMER | 58 | |

221 STANDARD AVERAGE VOLUME

222 VOLUME IMMEDIATELY AFTER SUPERPOSED SPEECH

THE EVALUATION OF THE CALL IS 65 POINTS.

THE OPERATOR IS HANAKO TANAKA (2000).

THE SUPERPOSITION TIME THAT THE OPERATOR CUT IN IS 7 SECONDS.

THE PROBLEMATIC SUPERPOSITION FREQUENCY THAT THE OPERATOR CUT IN IS ONE TIME.

OPERATOR EVALUATION SUPPORT DEVICE AND OPERATOR EVALUATION SUPPORT METHOD

CROSS-REFERENCE TO RELATED APPLICATION

This application is a U.S. continuation application filed under 35 USC 111(a) claiming benefit under 35 USC 120 and 365(c) of PCT Application JP2011/056403 filed on Mar. 17, 2011, the entire contents of which are incorporated herein by reference.

FIELD

The embodiments discussed herein are related to an operator evaluation support device and an operator evaluation support method for supporting evaluation of an operator at a call center.

BACKGROUND

In recent years, importance has been placed on improving the quality of an operator's telephone calls at call centers. The evaluation of the call quality of an operator is made by, for example, a supervisor controlling the operators. As one viewpoint of evaluating the call quality, for example, there is the superposition (overlapping) of the speech of the operator and the speech of the customer. There is conventionally known a technology of giving a low evaluation for the call quality of the operator when the speeches of the operator and the customer are superposed (see patent document 1).

Patent document 1: Japanese Laid-Open Patent Publication No. 2007-288242

However, in an actual telephone call from the customer, even when the speeches of the operator and the customer are superposed, there are cases where it is not determined as the operator's fault. For example, when the customer is unable to give smooth explanations and is speaking in an awkward manner, the operator may say something like "that is to say, you mean so and so", overlapping the customer's speech, to summarize the customer's question in place of the customer, to confirm the intention of the customer's question. In this case, the call quality of the operator is not to be given a low evaluation. However, in the conventional technology, it is not possible to objectively determine whether this is the case.

As described above, in a technology of giving a low evaluation for the call quality of the operator when the speeches of the operator and the customer are superposed, the call quality of the operator may be evaluated erroneously. Therefore, the supervisor is unable to accurately evaluate the call quality of the operator, and as a result, the supervisor is unable to appropriately supervise the operator.

SUMMARY

According to an aspect of the embodiments, an operator evaluation support device includes a speech recording unit configured to record speech times of a customer and an operator during a telephone call from the customer to which the operator attends; a superposition identifying unit configured to refer to the speech recording unit and identify a superposition speech, which is a speech of the operator that has started during a speech of the customer, during the telephone call; a problematic superposition identifying unit configured to identify a problematic superposition speech among the superposition speeches, by comparing a sound quality of a speech of the customer that has started after the superposition speech with a standard sound quality; a call information creating unit configured to refer to the speech recording unit and create telephone call information indicating the identified problematic superposition speech during the telephone call; and a sending unit configured to send the created telephone call information to an administrator terminal used by an administrator who is evaluating the operator.

The object and advantages of the invention will be realized and attained by means of the elements and combinations particularly pointed out in the appended claims. It is to be understood that both the foregoing general description and the following detailed description are exemplary and explanatory and are not restrictive of the invention as claimed.

BRIEF DESCRIPTION OF THE DRAWINGS

FIG. 5 is a configuration diagram of a customer DB;
FIG. 6 is a configuration diagram of a speech time DB;
FIG. 7 is a configuration diagram of a question DB;
FIG. 8 is a configuration diagram of an operator DB;
FIG. 9 is a configuration diagram of a voice DB;
FIG. 10 is a configuration diagram of a superpose evaluation DB;
FIG. 11 is a configuration diagram of a frequency evaluation DB;
FIGS. 16A and 16B indicate a flowchart of a process according to an OP evaluation program;
FIG. 17 is an image diagram of a process range selection screen;
FIG. 18 illustrates a configuration of a table creating table (work)

DESCRIPTION OF EMBODIMENTS

Preferred embodiments of the present invention will be explained with reference to accompanying drawings.

Figure 1:
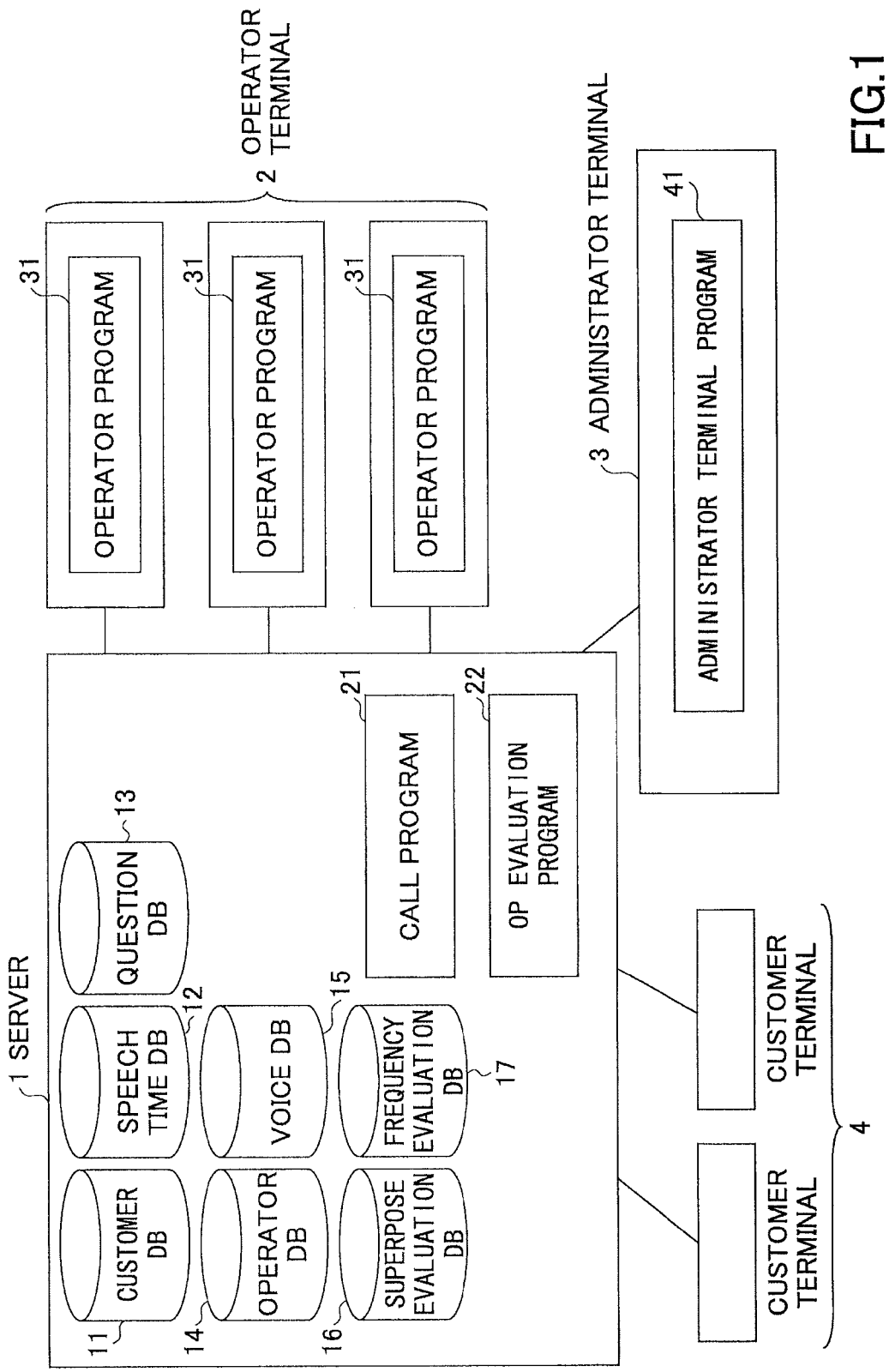
FIG. 1 illustrates a configuration of a call center system according to the present embodiment.

FIG. 1 illustrates a configuration of a call center system according to the present embodiment. The call center system of FIG. 1 includes a server 1, an operator terminal 2, an administrator terminal 3, and a customer terminal 4. The server 1 is an example of an operator evaluation support device.

The server 1 is connected to the operator terminal 2, the administrator terminal 3, and the customer terminal 4 via a predetermined network such as the Internet, a LAN (Local Area Network), and a public network.

The server 1 includes a customer DB 11, a speech time DB 12, a question DB 13, an operator DB 14, a voice DB 15, a superpose evaluation DB 16, a frequency evaluation DB 17, a call program 21, and an OP (operator) evaluation program 22. Furthermore, the operator terminal 2 includes an operator program 31. The administrator terminal 3 includes an administrator terminal program 41. The administrator terminal 3 is operated by a supervisor, who is an example of the administrator.

The server 1 executes the call program 21 and the OP evaluation program 22. By executing the call program 21, the server 1 connects with the customer terminal 4 and the operator terminal 2, records calls, and sends information of the customer to the operator terminal 2.

Furthermore, by executing the OP evaluation program 22, the server 1 creates information used by the supervisor for evaluating the operator, and sends information used by the supervisor for evaluating the operator to the administrator terminal 3.

The operator terminal 2 executes the operator program 31. By executing the operator program 31, the operator terminal 2 displays information of the customer received from the server 1. The administrator terminal 3 executes the administrator terminal program 41.

By executing the administrator terminal program 41, the administrator terminal 3 displays information used by the supervisor for evaluating the operator, which has been received from the server 1. Note that the customer terminal 4 may be any device having a telephone function, such as a telephone, and a PC having a telephone function.

The customer DB 11 records information relevant to the customer. The speech time DB 12 records information relevant to the speeches of the customer and the operator, such as the timings of the speeches of the customer and the operator. The question DB 13 records information relevant to a question from the customer. The operator DB 14 records information relevant to the state of the operator (attending to a call, available, etc.).

The voice DB 15 records information relevant to a voice file. The superpose evaluation DB 16 records information relevant to evaluations based on the superposition time. The frequency evaluation DB 17 records information relevant to evaluations based on the frequency of superposition (problematic superposition frequency).

Figure 2:
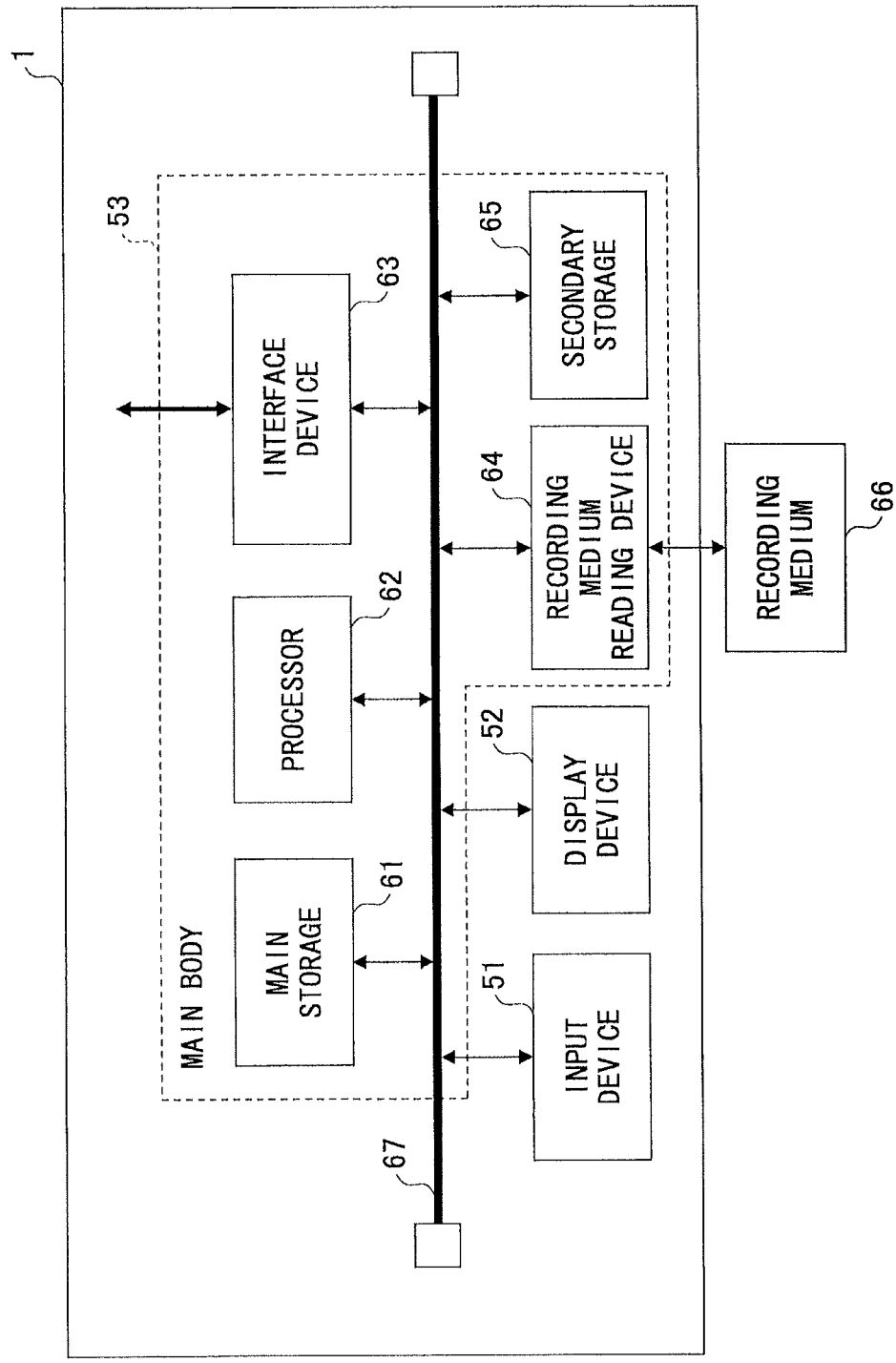
FIG. 2 is a hardware configuration diagram of a server.

FIG. 2 is a hardware configuration diagram of the server. The server 1 illustrated in FIG. 2 includes an input device 51, a display device 52, and a main body 53. The main body 53 includes a main storage 61, a processor 62, an interface device 63, a recording medium reading device 64, and a secondary storage 65, which are interconnected by a bus 67. The input device 51 and the display device 52 are connected to the bus 67.

The input device 51, the display device 52, the main storage 61, the processor 62, the interface device 63, the recording medium reading device 64, and the secondary storage 65, which are interconnected by the bus 67, may exchange data with each other under the control of the processor 62. The processor 62 is a CPU (Central Processing Unit) that controls the operations of the entire server 1.

The interface device 63 receives data from the operator terminal 2, the administrator terminal 3, and the customer terminal 4, and passes the contents of the data to the processor 62. Furthermore, the interface device 63 sends data to the operator terminal 2, the administrator terminal 3, and the customer terminal 4 according to instructions from the processor 62.

The secondary storage 65 stores an operator evaluation support program that causes a computer to perform a process in at least the operator evaluation support device, as part of the program for causing the server 1 to exhibit the same functions as the operator evaluation support device. The operator evaluation support program includes the call program 21, the OP evaluation program 22, and the information search program 23.

Then, as the processor 62 reads the operator evaluation support program from the secondary storage 65 and executes the operator evaluation support program, the server 1 functions as an operator evaluation support device. The operator evaluation support program may be stored in the main storage 61 accessible by the processor 62. The input device 51 receives input of data under the control of the processor 62. The operator evaluation support program may be recorded in a recording medium 66 readable by the server 1.

The recording medium 66 readable by the server 1 may be a magnetic recording medium, an optical disk, a magneto-optical recording medium, and a semiconductor memory. Examples of the magnetic recording medium are a HDD, a flexible disk (FD), and a magnetic tape (MT). Examples of an optical disk are a DVD (Digital Versatile Disc), a DVD-RAM, a CD-ROM (Compact Disc-Read Only Memory), and a CD-R (Recordable)/RW (ReWritable). An example of a magneto-optical recording medium is a MO (Magneto-Optical disk).

When distributing the operator evaluation support program, for example, a portable recording medium 66 such as a DVD and a CD-ROM recording the operator evaluation support program may be sold.

For example, in the server 1 executing the operator evaluation support program, the recording medium reading device 64 reads the operator evaluation support program from the recording medium 66 recording the operator evaluation support program. The processor 62 stores the read operator evaluation support program in the main storage 61 or the secondary storage 65. The server 1 reads the operator evaluation support program from the main storage 61 or the secondary storage 65 that is a storage device included in itself, and executes a process in accordance with the operator evaluation support program.

Figure 3:
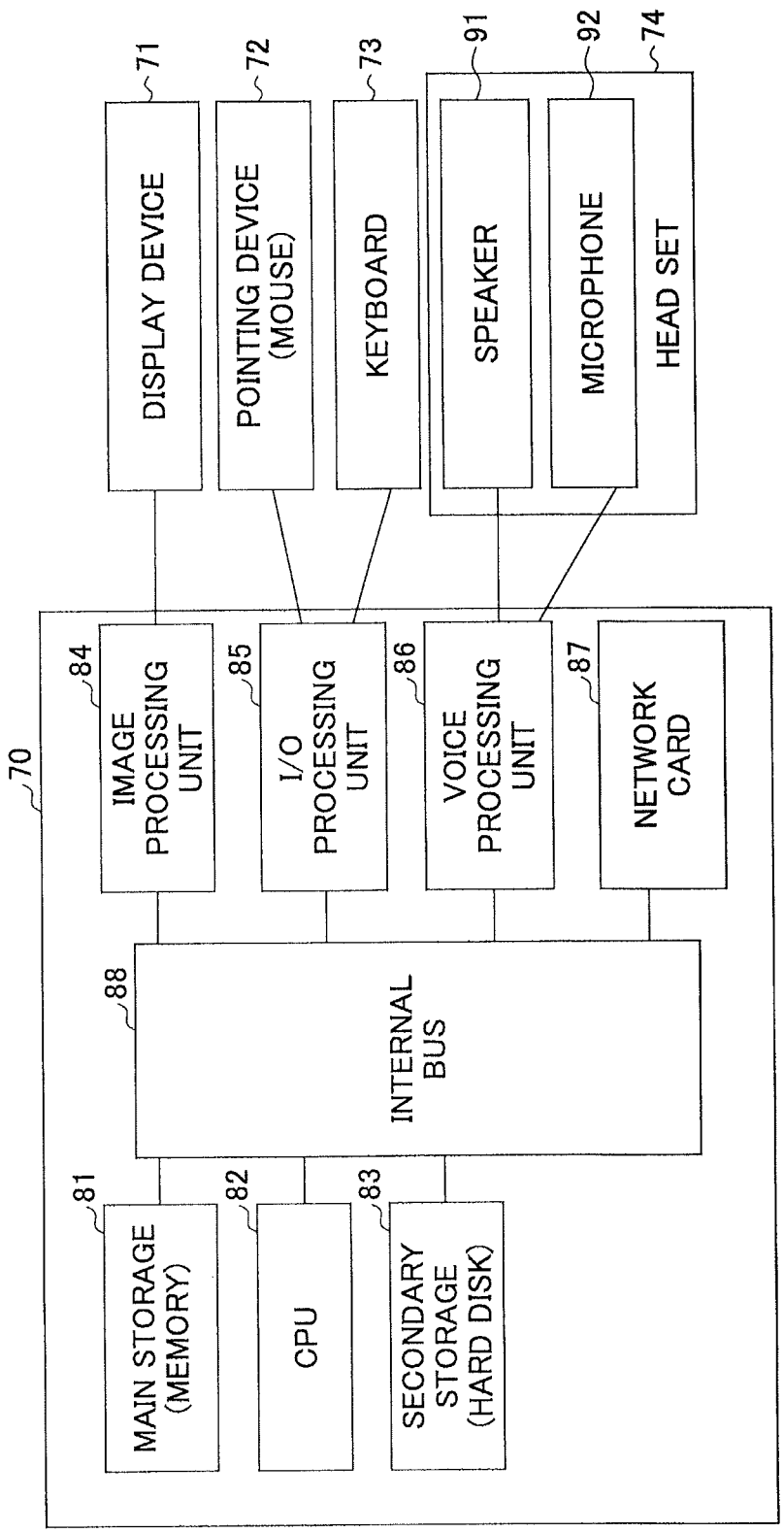
FIG. 3 is a hardware configuration diagram of an operator terminal and an administrator terminal.

FIG. 3 is a hardware configuration diagram of the operator terminal 2 and the administrator terminal 3. The operator terminal 2 and the administrator terminal 3 have the same hardware configuration. Thus, in the following, a description is given of the hardware configuration of the operator terminal 2. A description of the hardware configuration of the administrator terminal 3 is omitted.

The operator terminal 2 of FIG. 3 includes a main body 70, a display device 71, a pointing device 72, a keyboard 73, and a head set 74. The main body 70 includes a main storage 81, a CPU 82, a secondary storage 83, an image processing unit 84, an I/O processing unit 85, a voice processing unit 86, and a network card 87, which are interconnected by an internal bus 88. The head set 74 includes a speaker 91 and a microphone 92.

The main storage 81, the secondary storage 83, the image processing unit 84, the I/O processing unit 85, the voice processing unit 86, and the network card 87, which are interconnected by the internal bus 88, may exchange data under the control of the CPU 82. The CPU 82 is a Central Processing Unit that controls the operations of the entire operator terminal 2.

The image processing unit 84 is for performing various processes for displaying an image with the display device 71. The I/O processing unit 85 processes the input and output of data with the pointing device 72 and the keyboard 73. The voice processing unit 86 processes voice data exchanged with the speaker 91 and the microphone 92 of the head set 74.

The network card 87 receives data from the server 1, and passes the contents of the data to the CPU 82. Furthermore, the network card 87 sends data to the server 1 according to instructions from the CPU 82.

For example, in the operator terminal 2, the operator program 31 is installed. The operator terminal 2 executes the operator program 31. In the main storage 81, as part of a program for operating the operator terminal 2, at least the operator program 31 is stored. The CPU 82 reads the operator program 31 from the main storage 81 and executes the operator program 31.

The operator program 31 may be recorded in a recording medium readable by the operator terminal 2. When distributing the operator program 31, for example, a portable recording medium such as a DVD and a CD-ROM recording the operator program 31 may be sold. An application distribution mechanism on the Internet may be used.

The operator terminal 2 that executes the operator program 31 reads the operator program 31 from a recording medium recording the operator program 31. The CPU 82 stores the operator program 31 in the main storage 81. The CPU 82 reads the operator program 31 from the main storage 81, and executes a process according to the operator program 31.

Figure 4:
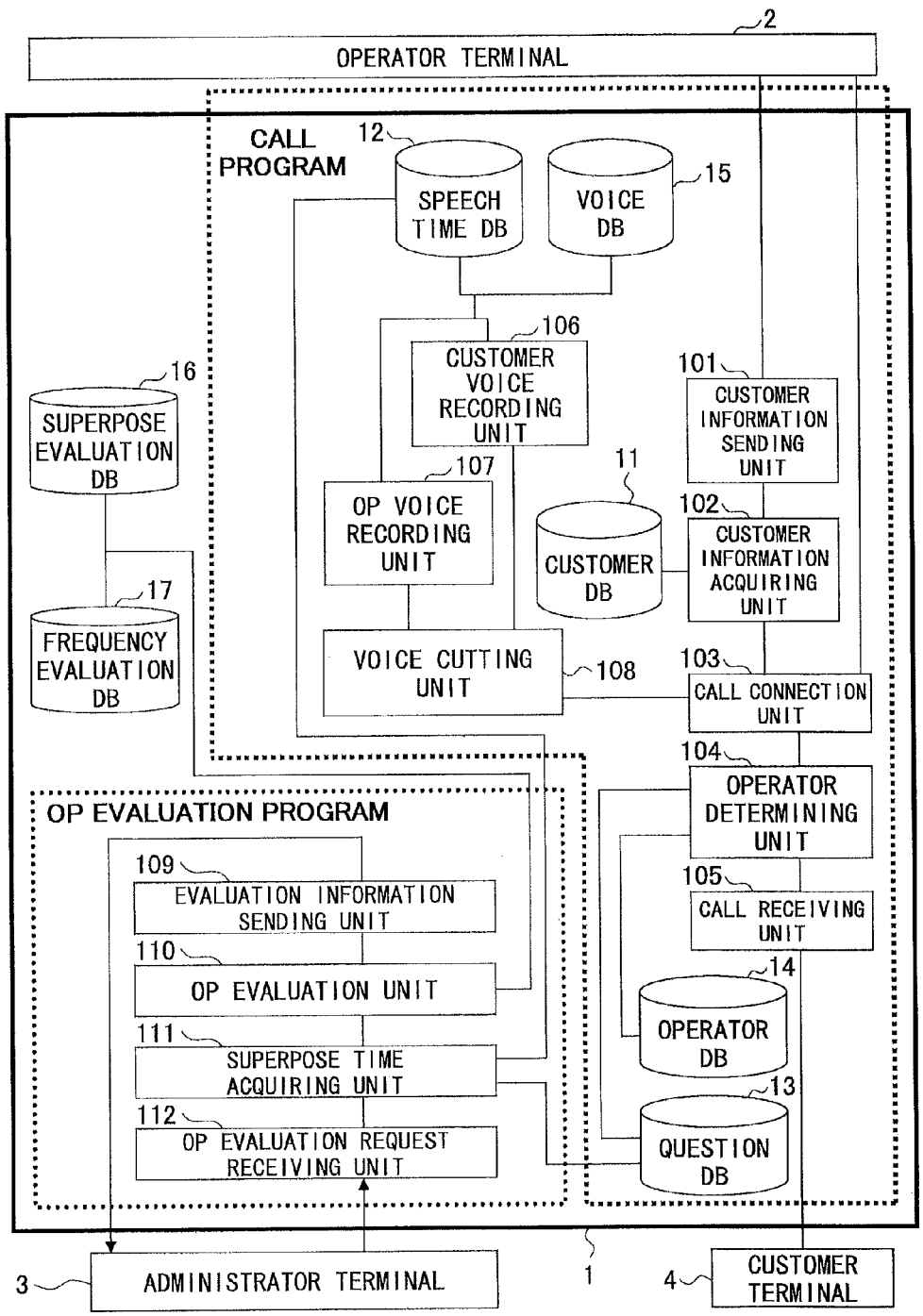
FIG. 4 is a function configuration diagram of a server.

FIG. 4 is a function configuration diagram of the server 1. The server 1 includes a customer DB 11, a speech time DB 12, a question DB 13, an operator DB 14, a voice DB 15, a superpose evaluation DB 16, and a frequency evaluation DB 17.

By executing the call program 21, the server 1 realizes a customer information sending unit 101, a customer information acquiring unit 102, a call connection unit 103, an operator determining unit 104, a call receiving unit 105, a customer voice recording unit 106, an OP voice recording unit 107, and a voice cutting unit 108.

Furthermore, by executing the OP evaluation program 22, the server 1 realizes an evaluation information sending unit 109, an OP evaluation unit 110, a superposition time acquiring unit 111, and an OP evaluation request receiving unit 112.

The customer information sending unit 101 sends information of the customer to the operator terminal 2. The customer information acquiring unit 102 acquires information of the customer from the customer DB 11. The call connection unit 103 connects the operator terminal 2 with the customer terminal 4. The operator determining unit 104 determines, from the operator DB 14, an operator who is not attending to a call. The call receiving unit 105 receives a call from the customer terminal 4.

The customer voice recording unit 106 writes the voice data of the customer in a voice file. The customer voice recording unit 106 writes the speech start time and the speech end time of the customer in the speech time DB 12. The OP voice recording unit 107 writes the voice data of the operator in the voice file. The OP voice recording unit 107 writes the speech start time and the speech end time of the operator in the speech time DB 12.

The voice cutting unit 108 separates the voice data of the customer from the voice data of the operator. For example, the voice cutting unit 108 cuts the right channel of the voice data as voice data of the customer, and cuts the left channel of the voice data as voice data of the operator.

The evaluation information sending unit 109 sends evaluation information to the administrator terminal 3. The OP evaluation unit 110 evaluates the operator as described below, by using the superpose evaluation DB 16 and the frequency evaluation DB 17. The superposition time acquiring unit 111 acquires the superposition time of the speech of the customer and the speech of the operator, from the speech time DB 12. The OP evaluation request receiving unit 112 receives a request for evaluating the operator from the administrator terminal 3.

FIG. 5 is a configuration diagram of the customer DB 11. The customer DB 11 includes data items such as a customer ID, a telephone number, a customer, an address, a purchased product model number, and a purchased store.

The data item "customer ID" is identification information for uniquely identifying a customer. The data item "telephone number" is the customer's telephone number. The data item "customer" is the name of the customer. The data item "address" is the address of the customer. The data item "purchased product model number" is the model number of the product purchased by the customer. The data item "purchased store" is the store at which the customer purchased the product.

FIG. 6 is a configuration diagram of the speech time DB 12. The speech time DB 12 includes data items such as a call ID, a time, an event, and an average-volume-in-speech. The data item "call ID" is identification information for uniquely identifying a call. The data item "time" is the time when an event occurs. The data item "event" expresses an event such the start of the speech and the end of a speech of the operator or the customer. The data item "average-volume-in-speech" is the average volume of the customer during a speech. The speech time DB 12 records the speech start time and the speech end time of the operator and the customer, and the average volume of the customer during a speech, in association with a call ID.

FIG. 7 is a configuration diagram of the question DB 13. The question DB 13 includes data items such as a call ID, a question date, a question time, a questioning customer, an attending operator, and a voice file.

The data item "call ID" is identification information for uniquely identifying a call. The data item "question date" is the date of receiving a call from the customer. The data item "question time" is the time of receiving a call from the customer. The data item "questioning customer" is the customer ID of the customer who has made the question. The data item "attending operator" is the operator ID of the operator who attended to the question from the customer. The data item "voice file" is the file name of a voice file that records the call corresponding to the call ID.

FIG. 8 is a configuration diagram of the operator DB 14. The operator DB 14 includes data items such as an operator ID, an operator name, and a status. The operator DB 14 records the status of "attending to a call" or "available" for each operator.

The data item "operator ID" is identification information for uniquely identifying the operator. The data item "operator name" is the name of the operator. The data item "status" is information indicating whether the operator is able to attend to a question from the customer.

FIG. 9 is a configuration diagram of the voice DB 15. The voice DB 15 includes data items such as a call ID, a voice file name, a left channel speaker, and a right channel speaker. The voice DB 15 records, for each call ID, the voice file name, a left channel speaker, and a right channel speaker.

The data item "call ID" is identification information for uniquely identifying a call. The data item "voice file name" is the file name of a voice file that records the call corresponding to the call ID. The data item "left channel speaker" is the speaker of the voice data written in the left channel. The data item "right channel speaker" is the speaker of the voice data written in the right channel.

FIG. 10 is a configuration diagram of the superpose evaluation DB 16. The superpose evaluation DB 16 includes data items such as one superposition time (seconds) and an evaluation point. The superpose evaluation DB 16 records an evaluation point for every one superposition time. The data item "one superposition time" expresses the time during which the speech of the operator and the speech of the customer are superposed.

FIG. 11 is a configuration diagram of the frequency evaluation DB 17. The frequency evaluation DB 17 includes data items such as a problematic superposition frequency and an evaluation point. The frequency evaluation DB 17 records an evaluation point for every problematic superposition frequency. The data item "problematic superposition frequency" expresses the frequency of a problematic portion (problematic superposition) in the portion where the speech of the operator overlaps (superposes) the speech of the customer. Details of problematic superposition are described below.

Figure 12:
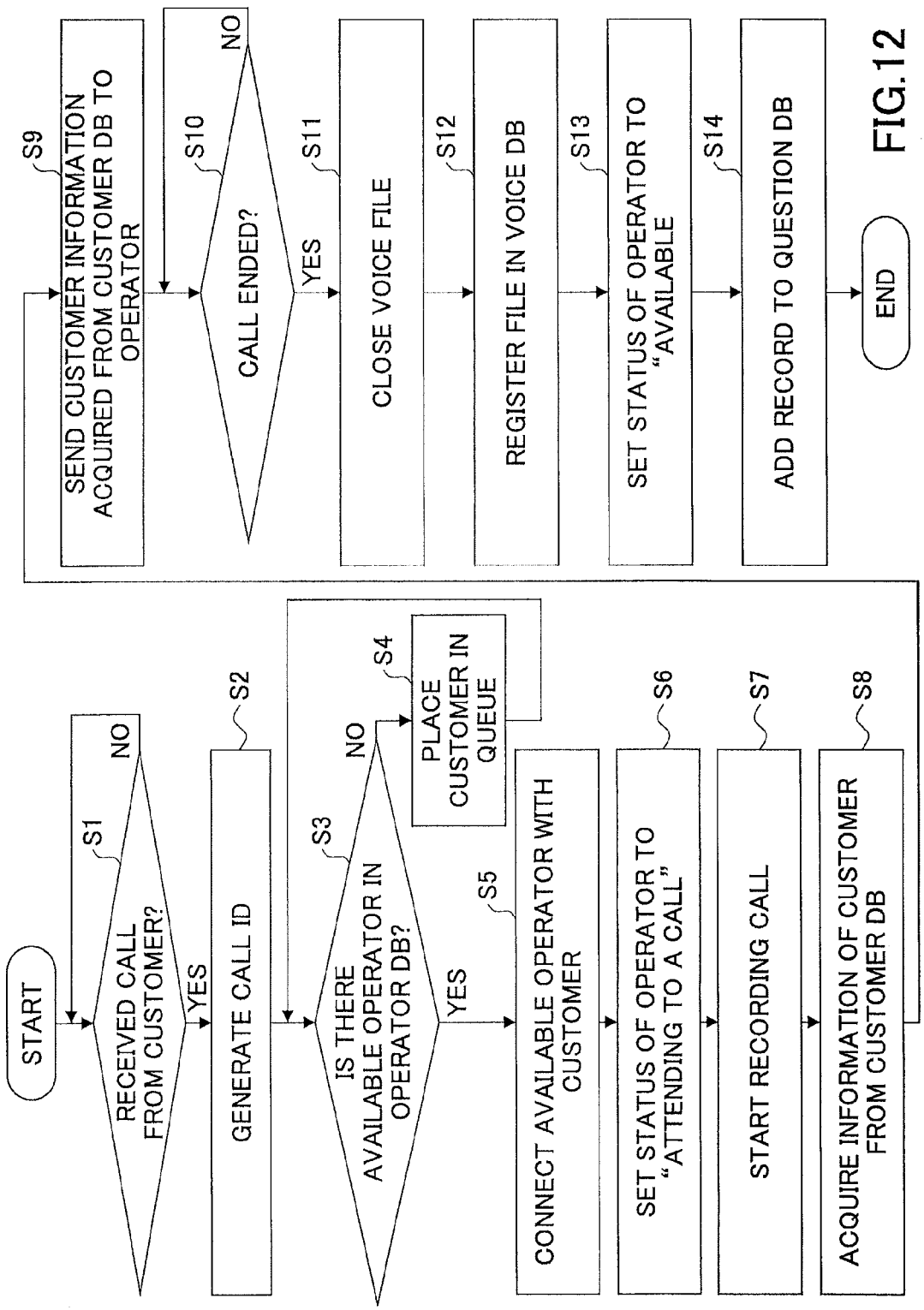
FIG. 12 is a flowchart of a process according to a call program.

FIG. 12 is a flowchart of a process according to the call program 21. In step S1, the call receiving unit 105 of the server 1 waits until a call is received from the customer terminal 4. When a call is received from the customer terminal 4, the call receiving unit 105 generates a call ID in step S2.

In step S3, the operator determining unit 104 refers to the operator DB 14, and determines whether there is an operator whose "status" data item is available (not "attending to a call"). When there is no operator who is available, in step S4, the operator determining unit 104 places the customer from which a call is received in a queue.

The operator determining unit 104 waits until it is determined that there is an available operator. When it is determined that there is an available operator, the operator determining unit 104 requests the call connection unit 103 to make a call connection between the available operator and the customer.

In step S5, the call connection unit 103 selects one available operator, and connects the operator terminal 2 of the selected operator with the customer terminal 4. In step S6, the operator determining unit 104 sets the data item "status" of the selected operator to "attending to a call" in the operator DB 14. In step S7, the call connection unit 103 starts recording the call. The recording of the call is performed by, for example, a recording process.

When the recording of the call is started, in step S8, the customer information acquiring unit 102 acquires information of the customer from the customer DB 11 based on the telephone number of the call. In step S9, the customer information sending unit 101 sends the information of the customer acquired from the customer DB 11 to the operator terminal 2.

In step S10, the call connection unit 103 waits until the call ends. When the call ends, in step S11, the call connection unit 103 closes the voice file. In step S12, the call connection unit 103 registers a record relevant to the voice file of the ended call, in the voice DB 15.

In step S13, the operator determining unit 104 sets the data item "status" of the operator whose call has ended, as available, in the operator DB 14. In step S14, the operator determining unit 104 adds a record relevant to the ended call in the question DB 13.

Figure 13:
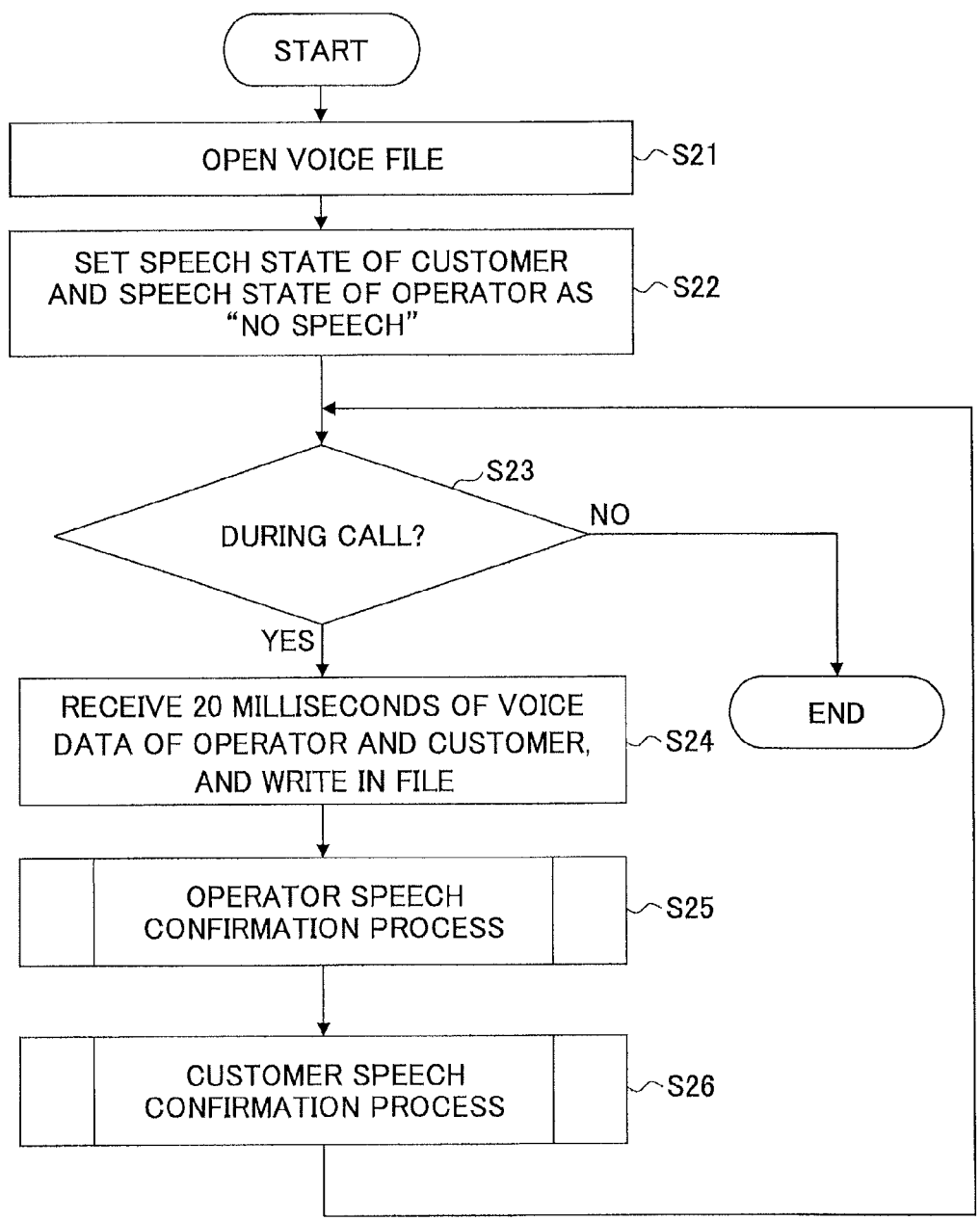
FIG. 13 is a flowchart of a recording process.

FIG. 13 is a flowchart of a recording process. In step S21, the call connection unit 103 opens a voice file. In step S22, the customer voice recording unit 106 sets the speech state of the customer as "no speech". The OP voice recording unit 107 sets the speech state of the operator as "no speech". In step S23, it is determined whether the call has ended, and the customer voice recording unit 106 and the OP voice recording unit 107 repeat steps S24 through S26 until the call ends.

In step S24, the customer voice recording unit 106 receives 20 milliseconds of the voice data of a customer among the voice data of the customer that has been cut by the voice cutting unit 108, and writes the received voice data in the voice file. The OP voice recording unit 107 receives 20 milliseconds of the voice data of an operator among the voice data of the operator that has been cut by the voice cutting unit 108, and writes the received voice data in the voice file.

In step S25, the customer voice recording unit 106 performs an operator speech confirmation process described below, confirms the speech start time and the speech end time of the operator, and writes the speech start time and the speech end time in the speech time DB 12. Furthermore, in step S26, the customer voice recording unit 106 performs a customer speech confirmation process described below, confirms the speech start time and the speech end time of the customer, and writes the speech start time and the speech end time in the speech time DB 12.

Figure 14:
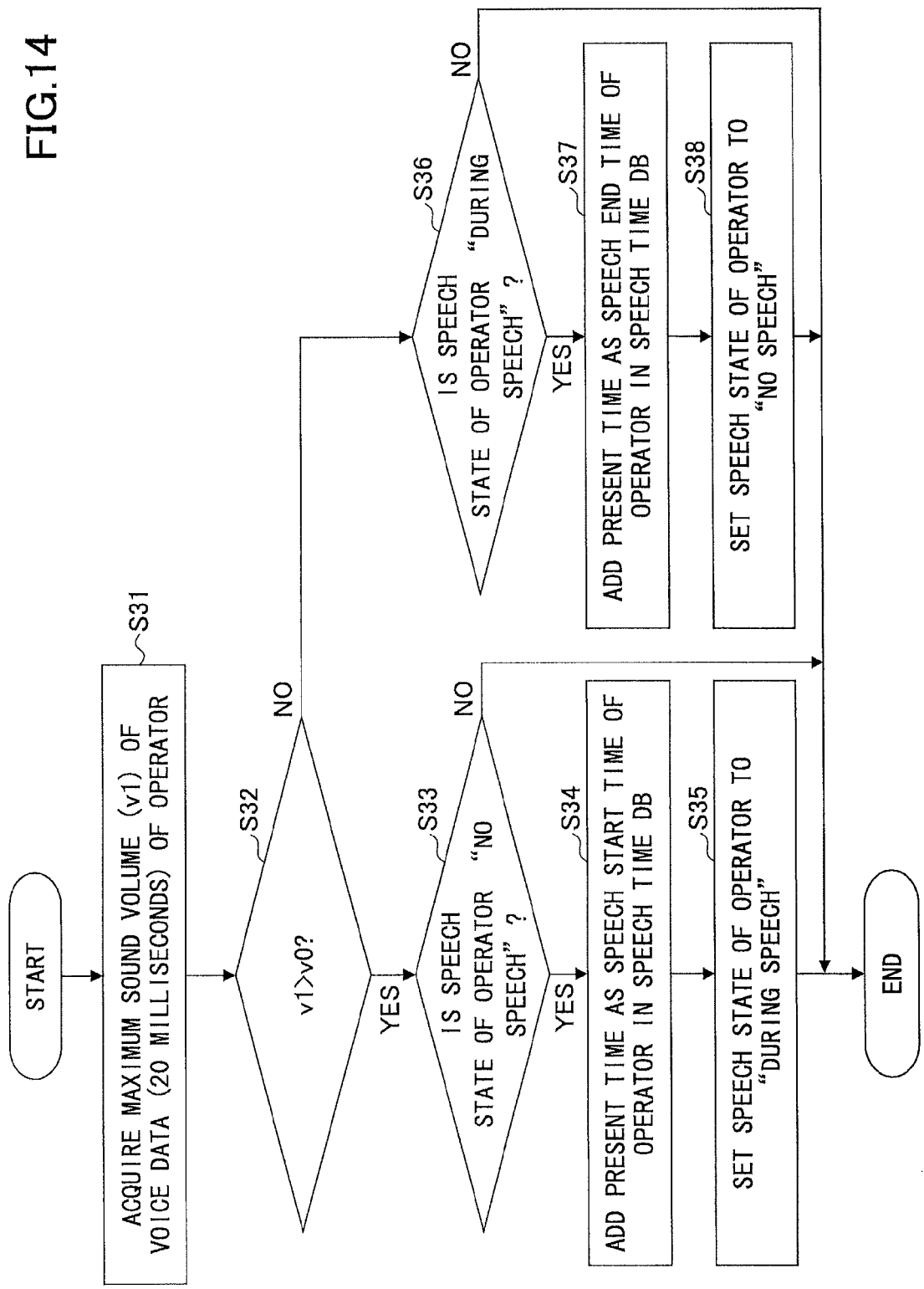
FIG. 14 is a flowchart of an operator speech confirmation process.

FIG. 14 is a flowchart of an operator speech confirmation process. In step S31, the OP voice recording unit 107 acquires the maximum sound volume (v1) of 20 milliseconds of the voice data of the operator.

In step S32, the OP voice recording unit 107 compares the maximum sound volume (v1) of the voice data of the operator with the sound volume (v0) determined as silent, and determines whether v1>v0 is satisfied.

When the OP voice recording unit 107 determines that v1>v0 is satisfied, the OP voice recording unit 107 determines whether the speech state of the operator is "no speech" in step S33. When the speech state of the operator is "no speech", in step S34, the OP voice recording unit 107 records the present time as the speech start time of the operator, in the speech time DB 12.

In step S35, the OP voice recording unit 107 sets the speech state of the operator to "during speech", and then ends the operator speech confirmation process of FIG. 14. When the speech state of the operator is not "no speech" in step S33, the OP voice recording unit 107 ends the operator speech confirmation process of FIG. 14.

When the OP voice recording unit 107 determines that v1>v0 is not satisfied, in step S36, the OP voice recording unit 107 determines whether the speech state of the operator is "during speech". When the speech state of the operator is "during speech", in step S37, the OP voice recording unit 107 records the present time as the speech end time of the operator in the speech time DB 12.

In step S38, the OP voice recording unit 107 sets the speech state of the operator to "no speech", and then ends the operator speech confirmation process of FIG. 14. When the speech state of the operator is not "during speech" in step S36, the OP voice recording unit 107 ends the operator speech confirmation process of FIG. 14.

Figure 15:
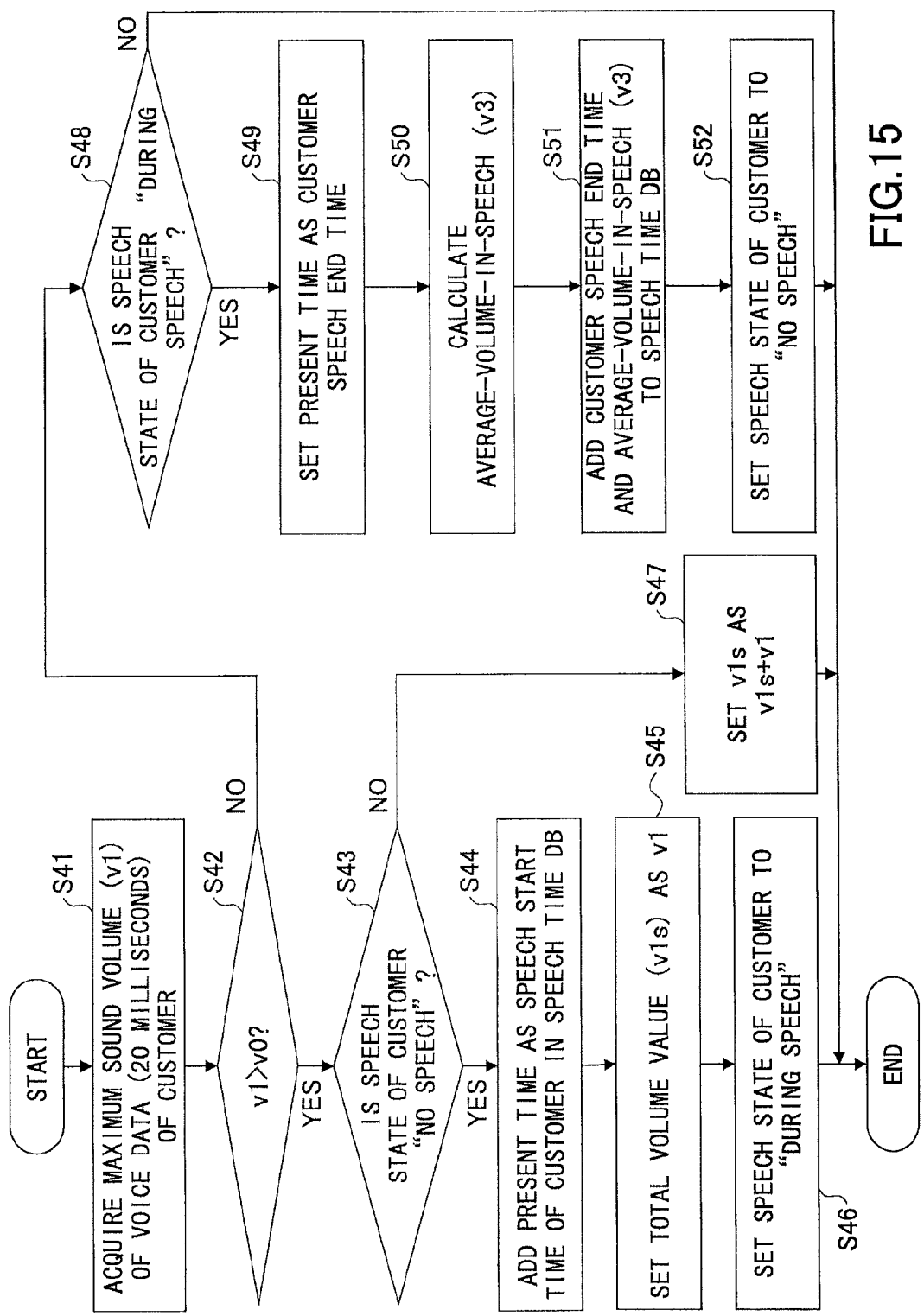
FIG. 15 is a flowchart of a customer speech confirmation process.

FIG. 15 is a flowchart of a customer speech confirmation process. In step S41, the customer voice recording unit 106 acquires the maximum sound volume (v1) of 20 milliseconds of the voice data of the customer.

In step S42, the customer voice recording unit 106 compares the maximum sound volume (v1) of the voice data of the customer with the sound volume (v0) determined as silent, and determines whether v1>v0 is satisfied.

When the customer voice recording unit 106 determines that v1>v0 is satisfied, in step S43, the customer voice recording unit 106 determines whether the speech state of the customer is "no speech". When the speech state of the customer is "no speech", in step S44, the customer voice recording unit 106 records the present time as the speech start time of the customer in the speech time DB 12.

In step S45, the customer voice recording unit 106 sets the total volume value (v1s) as v1. In step S46, the customer voice recording unit 106 sets the speech state of the customer to "during speech", and then ends the customer speech confirmation process of FIG. 15.

When the speech state of the customer is not "no speech" in step S43, in step S47, the customer voice recording unit 106 sets a value obtained by adding v1 to v1s as the new total volume value (v1s). Then, the customer voice recording unit 106 ends the customer speech confirmation process of FIG. 15.

When the customer voice recording unit 106 determines that v1>v0 is not satisfied, in step S48, the customer voice recording unit 106 determines whether the speech state of the customer is "during speech". When the speech state of the customer is "during speech", in step S49, the customer voice recording unit 106 records the present time as the speech end time of the customer.

In step S50, the customer voice recording unit 106 calculates the average-volume-in-speech (v3) by the following formula (1). In formula (1), 50 expresses the number of data acquired per second.

$$\text{average-volume-in-speech } (v3) = \frac{\text{total volume value } (v1s)}{(\text{speech end time} - \text{speech start time}) \times 50} \quad (1)$$

In step S51, the customer voice recording unit 106 records the speech end time of the customer in the speech time DB 12, and records the average-volume-in-speech (v3) in the speech time DB 12.

In step S52, the customer voice recording unit 106 sets the speech state of the customer to "no speech", and ends the customer speech confirmation process of FIG. 15. In step S48, when the speech state of the customer is not "during speech", the customer voice recording unit 106 ends the customer speech confirmation process of FIG. 15.

Figure 16A:
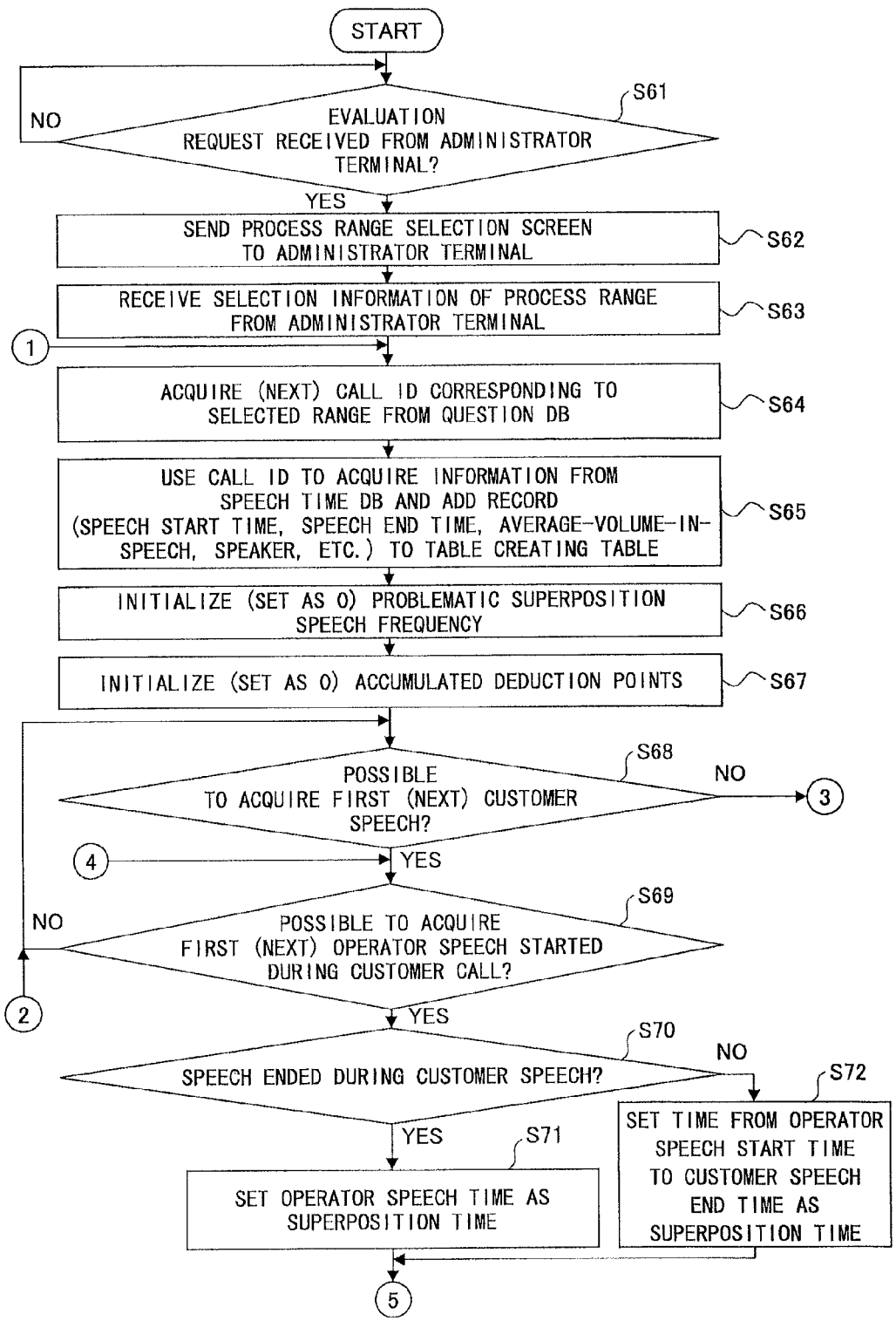

FIGS. 16A and 16B indicate a flowchart of a process according to the OP evaluation program 22. In step S61, the OP evaluation request receiving unit 112 waits until an evaluation request is received from the administrator terminal 3. When an evaluation request is received from the administrator terminal 3, in step S62, the OP evaluation request receiving unit 112 sends a process range selection screen described below to the administrator terminal 3.

The administrator terminal 3 that has received the process range selection screen displays the process range selection screen described below and prompts the administrator to input selection information of the process range. The administrator terminal 3 sends the selection information of the process range input by the administrator, to the server 1. In step S63, the OP evaluation request receiving unit 112 receives the selection information of the process range from the administrator terminal 3.

In step S64, the superposition time acquiring unit 111 acquires, from the question DB 13, the first or the next call ID corresponding to the selection information of the process range received from the administrator terminal 3. In step S65, the superposition time acquiring unit 111 uses the acquired call ID to acquire information from the speech time DB 12, and adds, to the table creating table (work) described below, a record including the data items of a speech start time, a speech end time, a speaker, an average-volume-in-speech, and a problem flag.

In step S66, the superposition time acquiring unit 111 initializes the problematic superposition speech frequency. For example, the initialization is done by setting the value to zero. In step S67, the superposition time acquiring unit 111 initializes accumulated deduction points.

In step S68, the superposition time acquiring unit 111 determines whether the first or the next customer speech may be acquired from the table creating table described below. When the superposition time acquiring unit 111 determines that the first or the next customer speech may be acquired, in step S69, the superposition time acquiring unit 111 determines whether the first or the next operator speech that has started during the customer speech may be acquired from the table creating table described below.

When the superposition time acquiring unit 111 determines that the first or the next operator speech that has started during the customer speech may be acquired, in step S70, the superposition time acquiring unit 111 determines whether the first or the next operator speech that has started during the customer speech has ended during the customer speech.

When the superposition time acquiring unit 111 determines that the first or the next operator speech that has started during the customer speech has ended during the customer speech, in step S71, the superposition time acquiring unit 111 sets the operator speech time as the superposition time.

When the superposition time acquiring unit 111 determines that the first or the next operator speech that has started during the customer speech has not ended during the customer speech, in step S72, the superposition time acquiring unit 111 sets the time from the operator speech start time to the customer speech end time as the superposition time.

In step S73, the OP evaluation unit 110 performs the standard average volume calculation process described below. In step S74, the OP evaluation unit 110 determines whether the average-volume-in-speech of the next customer speech is acquired from the table creating table described below.

When the average-volume-in-speech of the next customer speech is acquired, in step S75, the OP evaluation unit 110 determines whether the acquired average-volume-in-speech is higher than the standard average volume. When the OP evaluation unit 110 determines that the acquired average-volume-in-speech is higher than the standard average volume, in step S76, the OP evaluation unit 110 increments the problematic superposition speech frequency.

In step S77, the OP evaluation unit 110 uses the superpose evaluation DB 16 to acquire the evaluation point (time evaluation point) in the one superposition time. In step S78, the OP evaluation unit 110 adds the time evaluation point to the accumulated deduction points. In step S79, the OP evaluation unit 110 places a problem flag in the operator speech (the operator speech acquired in step S69) of the table creating table, and then returns to the process of step S69.

In step S75, when the OP evaluation unit 110 determines that the acquired average-volume-in-speech is not higher than the standard average volume, the OP evaluation unit 110 returns to the process of step S69. In step S74, when the OP evaluation unit 110 determines that the average-volume-inspeech of the next customer speech is not acquired, the OP evaluation unit 110 returns to the process of step S68.

In step S69, when the superposition time acquiring unit 111 determines that it is not possible to acquire the first or the next operator speech that has started during the customer speech, the superposition time acquiring unit 111 returns to the process of step S68.

In step S68, when the superposition time acquiring unit 111 determines that it is not possible to acquire the first or the next customer speech, in step S80, the OP evaluation unit 110 acquires the problematic superposition speech frequency.

In step S81, the OP evaluation unit 110 uses the frequency evaluation DB 17 to acquire the evaluation point (frequency evaluation point) in the problematic superposition speech frequency (problematic superposition frequency). In step S82, the OP evaluation unit 110 adds the frequency evaluation point to the accumulated deduction points.

In step S83, the OP evaluation unit 110 sets a value obtained by subtracting the accumulated deduction points from the maximum points, as the evaluation point. In step S84, the OP evaluation unit 110 performs a speech table creating process as described below. In step S85, the evaluation information sending unit 109 sends the speech table to the administrator terminal 3 from which the evaluation request is received.

In step S86, the evaluation information sending unit 109 determines whether the next call ID corresponding to the selection information of the process range received from the administrator terminal 3 is present in the question DB 13. When a next call ID is present, in step S64, the evaluation information sending unit 109 acquires the next call ID from the question DB 13, and then performs the process of step S65 and onward. When a next call ID is not present, the evaluation information sending unit 109 ends the process of the flowchart indicated in FIGS. 16A and 16B.

FIG. 17 is an image diagram of a process range selection screen 200. The process range selection screen 200 is used by the administrator for inputting selection information of the process range. The process range selection screen 200 prompts the administrator to specify a call ID or to specify a condition (date range or operator ID), as the selection information of the process range.

FIG. 18 illustrates a configuration of a table creating table (work) 201. The table creating table (work) 201 includes data items such a speech start time, a speech end time, the speaker, the speaker average volume, and a problem flag. The table creating table (work) 201 records a speech start time, a speech end time, the speaker, the average-volume-in-speech of the customer, and a problem flag for identifying the problematic speech, in association with each other.

Figure 19:
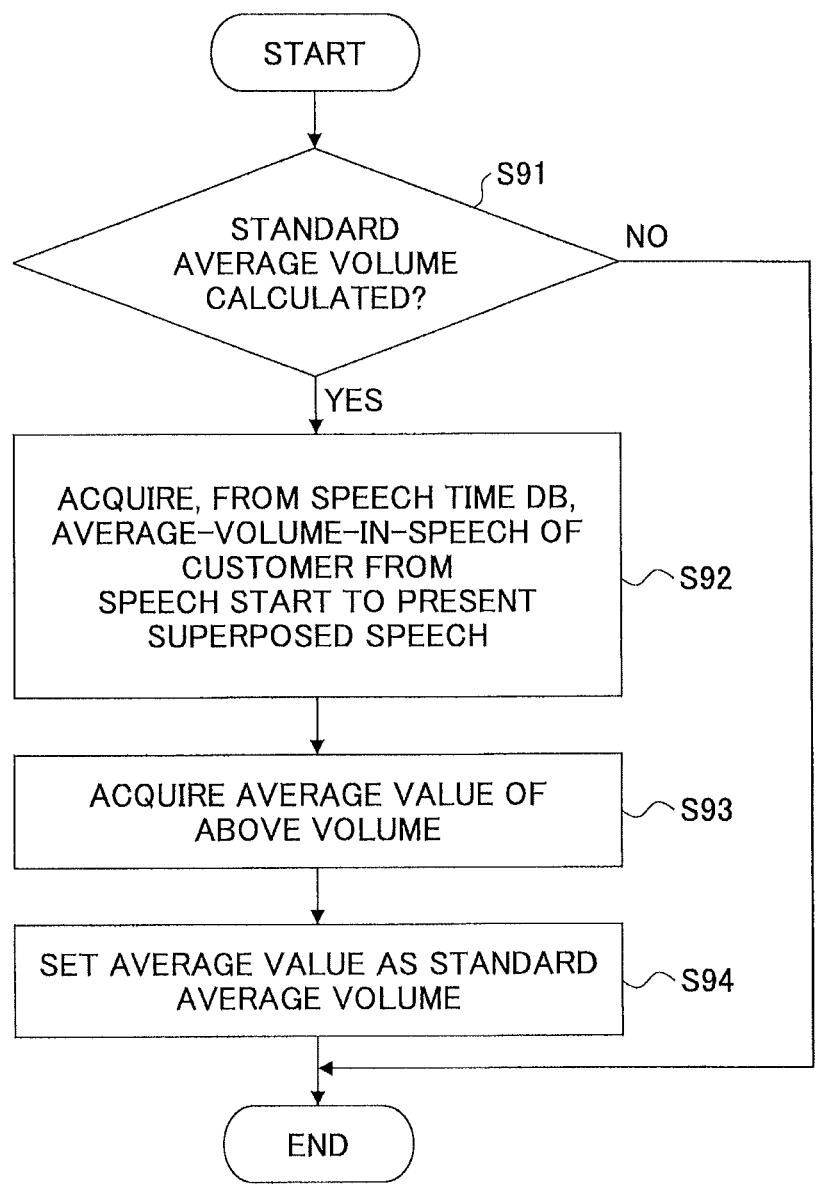
FIG. 19 is a flowchart of a standard average volume calculation process.

FIG. 19 is a flowchart of a standard average volume calculation process. In step S91, the OP evaluation unit 110 determines whether the standard average volume has been calculated. When the standard average volume has been calculated, in step S92, the OP evaluation unit 110 acquires, from the speech time DB 12, the average-volume-in-speech of the customer, from the speech start to the present superposition speech.

In step S93, the OP evaluation unit 110 acquires the average value of average-volumes-in-speech of the customer acquired in step S92. In step S94, the OP evaluation unit 110 sets the average value of average-volumes-in-speech of the customer acquired in step S93 as the standard average volume, and then ends the process of the flowchart of FIG. 19. When the standard average volume has been calculated in step S91, the process of the flowchart of FIG. 19 is ended.

Figure 20A:
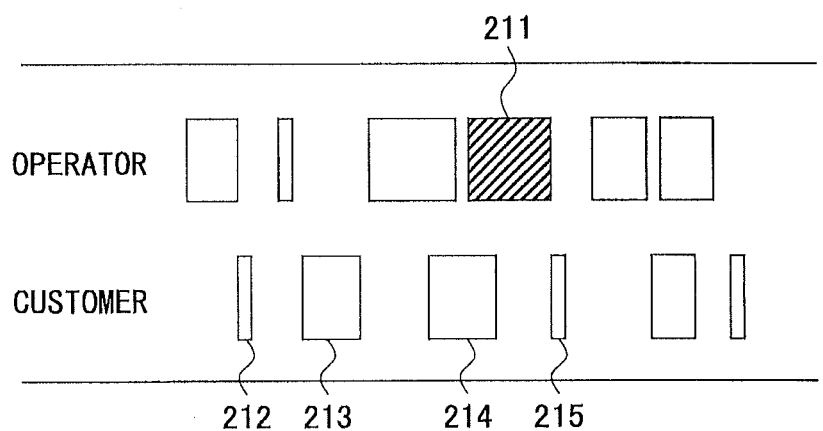
FIGS. 20A and 20B are image diagrams expressing the speeches of the operator and the customer, the standard average volume, and the average-volume-in-speech of the customer.
Figure 20B:
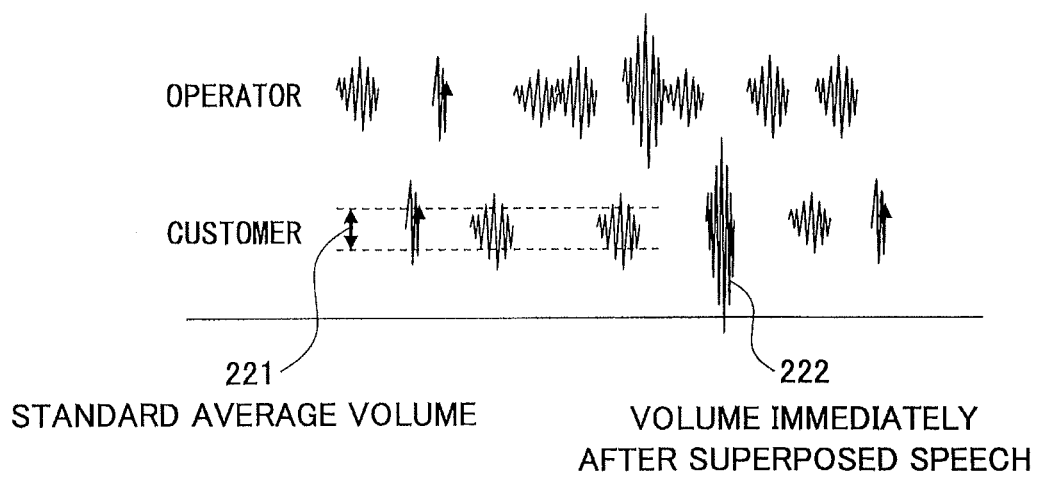

FIGS. 20A and 20B are image diagrams expressing the speeches of the operator and the customer, the standard average volume, and the average-volume-in-speech of the customer. FIG. 20A indicates the timings of the speeches of the operator and the customer with frames. FIG. 20B expresses the volume of the speeches of the operator and the customer. In FIGS. 20A and 20B, the horizontal direction expresses the passage of time. In FIG. 20A, a speech of the operator 211 is an example of an operator's speech that has started during a speech of the customer 214.

FIG. 20B indicates a standard average volume of the customer 221 from the start of the call to the speech of the customer 214 which is a superposition speech. The standard average volume of the customer 221 is the average value of the average volumes in speeches of the customer 212 through 214.

Furthermore, a volume 222 is the average-volume-in-speech of a speech 215 of a customer immediately after the superposition speech 214. In the example of FIG. 20B, the average-volume-in-speech 222 of the speech 215 of the customer immediately after the superposition speech 214 is higher than the standard average volume 221, and therefore the speech 215 is determined as the problematic superposition speech.

Figure 21:
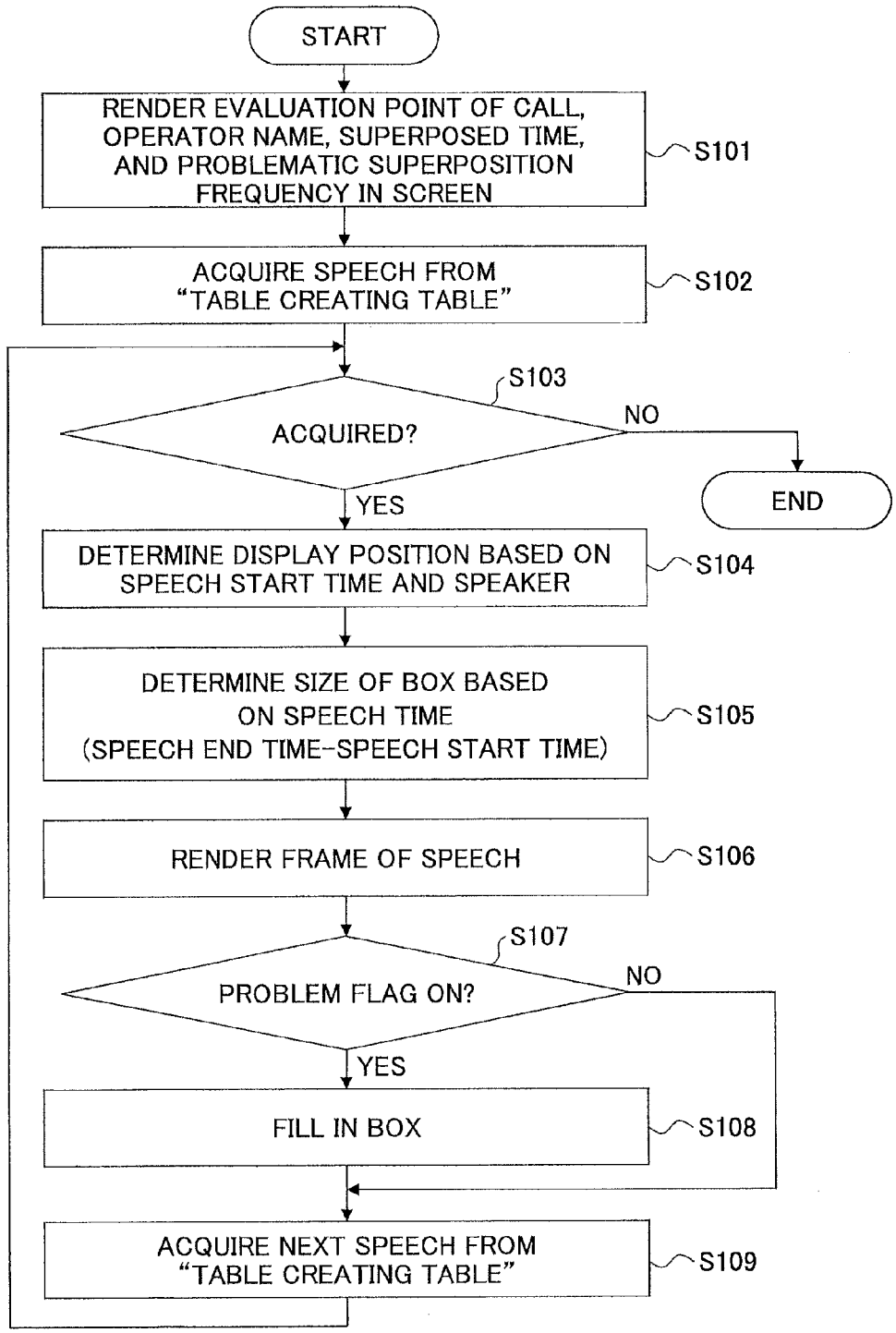
FIG. 21 is a flowchart of a speech table creating process.

FIG. 21 is a flowchart of a speech table creating process. In step S101, the OP evaluation unit 110 acquires the evaluation point of the call, the operator name, the superposed time, and the problematic superposition frequency, and renders these in a screen.

In step S102, the OP evaluation unit 110 acquires a record of a speech from the table creating table 201. In step S103, the OP evaluation unit 110 determines whether a record of a speech is acquired from the table creating table 201. When a record of a speech is acquired, in step S104, the OP evaluation unit 110 determines the display position based on the speech start time and the speaker. In step S105, the OP evaluation unit 110 determines the size of a box (frame of speech) indicating the speech on the screen, based on the speech time (speech end time-speech start time). In step S106, the OP evaluation unit 110 renders the frame of the speech on the screen.

In step S107, the OP evaluation unit 110 determines whether a problem flag included in record of the speech acquired in step S102, is ON. When the problem flag is ON, in step S108, the OP evaluation unit 110 fills in the inside of the box indicating the speech in the screen.

After the filling-in process, the OP evaluation unit 110 acquires a record of the next speech from the table creating table 201 in step S109. Until it is not possible to acquire a record of a next speech, the OP evaluation unit 110 repeats the process of steps S103 through S109. When the problem flag is not ON in step S107, the OP evaluation unit 110 performs the process of step S109. In step S103, when it is not possible to acquire a record of a next speech, the OP evaluation unit 110 ends the process of the flowchart of FIG. 21.

Figure 22:
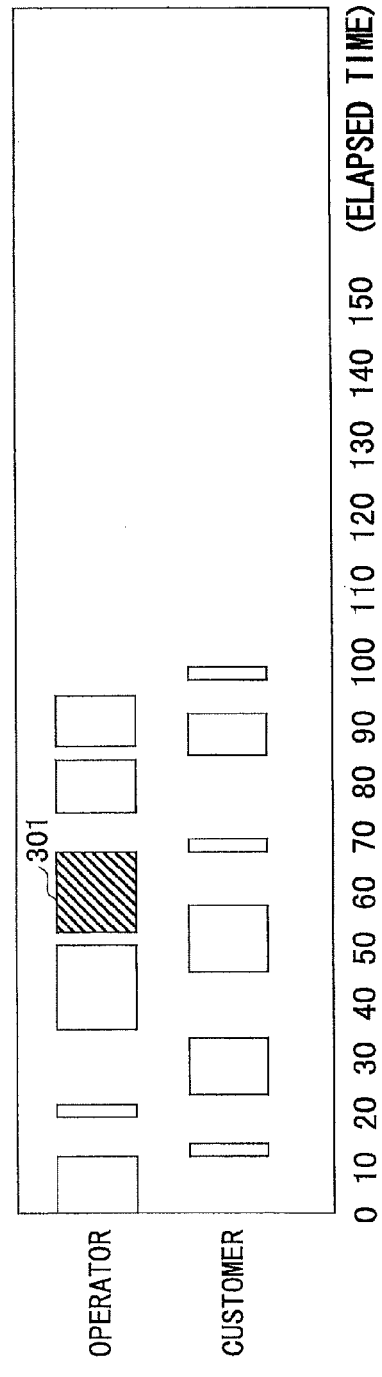
FIG. 22 is a screen image diagram of a speech table.

FIG. 22 is a screen image diagram of a speech table. In a speech table 300 of FIG. 22, an evaluation point of the call, an operator name, a superposition time, a problematic superposition frequency, and frames of speeches of the operator and the customer, are displayed.

For example, by clicking a frame of the speech of the operator and a customer with a mouse, the speech table 300 is able to play recorded speeches of the operator and the customer. Furthermore, among the speeches of the operator overlapping the speeches of the customer, a problematic speech 301 is expressed by hatched lines so as to be identified. In the speech table 300 of FIG. 22, the elapsed time is expressed by the relative time instead of the actual time. The time may be easily switched between the actual time and the relative time.

Figure 23:
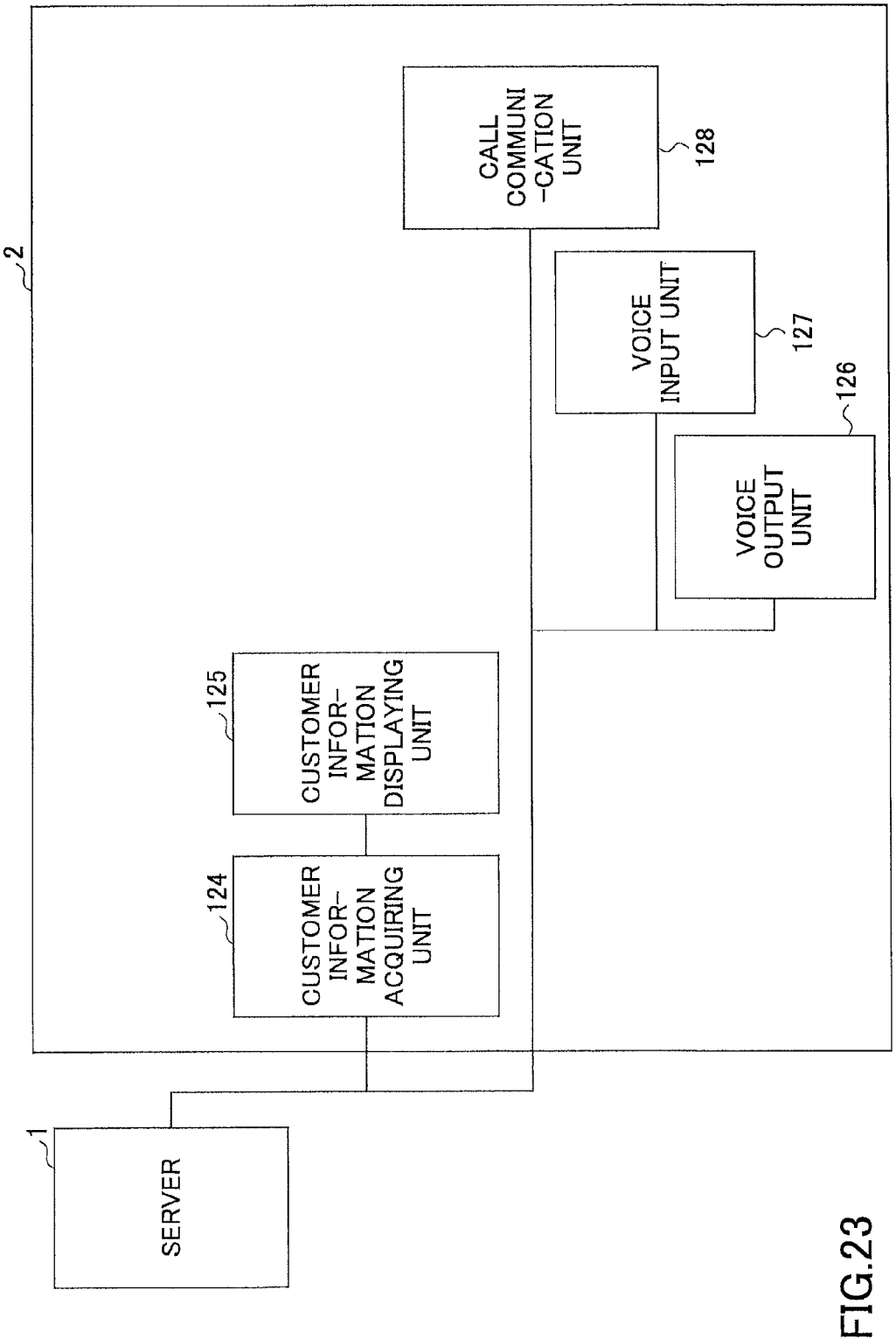
FIG. 23 is a function configuration diagram of the operator terminal.

FIG. 23 is a function configuration diagram of the operator terminal 2. The operator terminal 2 includes a customer information acquiring unit 124, a customer information displaying unit 125, a voice output unit 126, a voice input unit 127, and a call communication unit 128.

By executing the operator program 31, the operator terminal 2 realizes the customer information acquiring unit 124, the customer information displaying unit 125, the voice output unit 126, the voice input unit 127, and the call communication unit 128.

The customer information acquiring unit 124 receives information of the customer from the server 1. The customer information displaying unit 125 displays the information of the customer on the display device 71. The voice output unit 126 outputs a voice with the speaker 91. The voice input unit 127 inputs a voice from the microphone 92. The call communication unit 128 communicates with the customer terminal 4.

Figure 24:
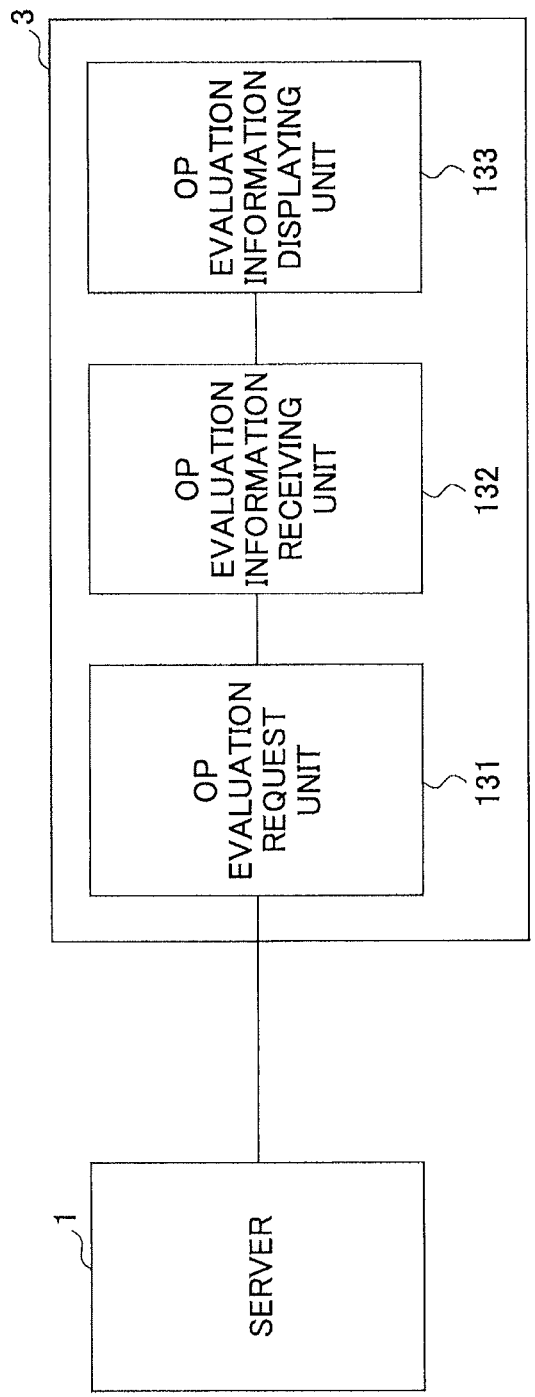
FIG. 24 is a function configuration diagram of the administrator terminal.

FIG. 24 is a function configuration diagram of the administrator terminal 3. The administrator terminal 3 includes an OP evaluation request unit 131, an OP evaluation information receiving unit 132, and an OP evaluation information displaying unit 133. The OP evaluation request unit 131 makes an evaluation request to the server 1. The OP evaluation information receiving unit 132 receives evaluation information from the server 1. The OP evaluation information displaying unit 133 displays the speech table 300 as illustrated in FIG. 22 on the display device 71, as an example of the evaluation information.

Figure 25:
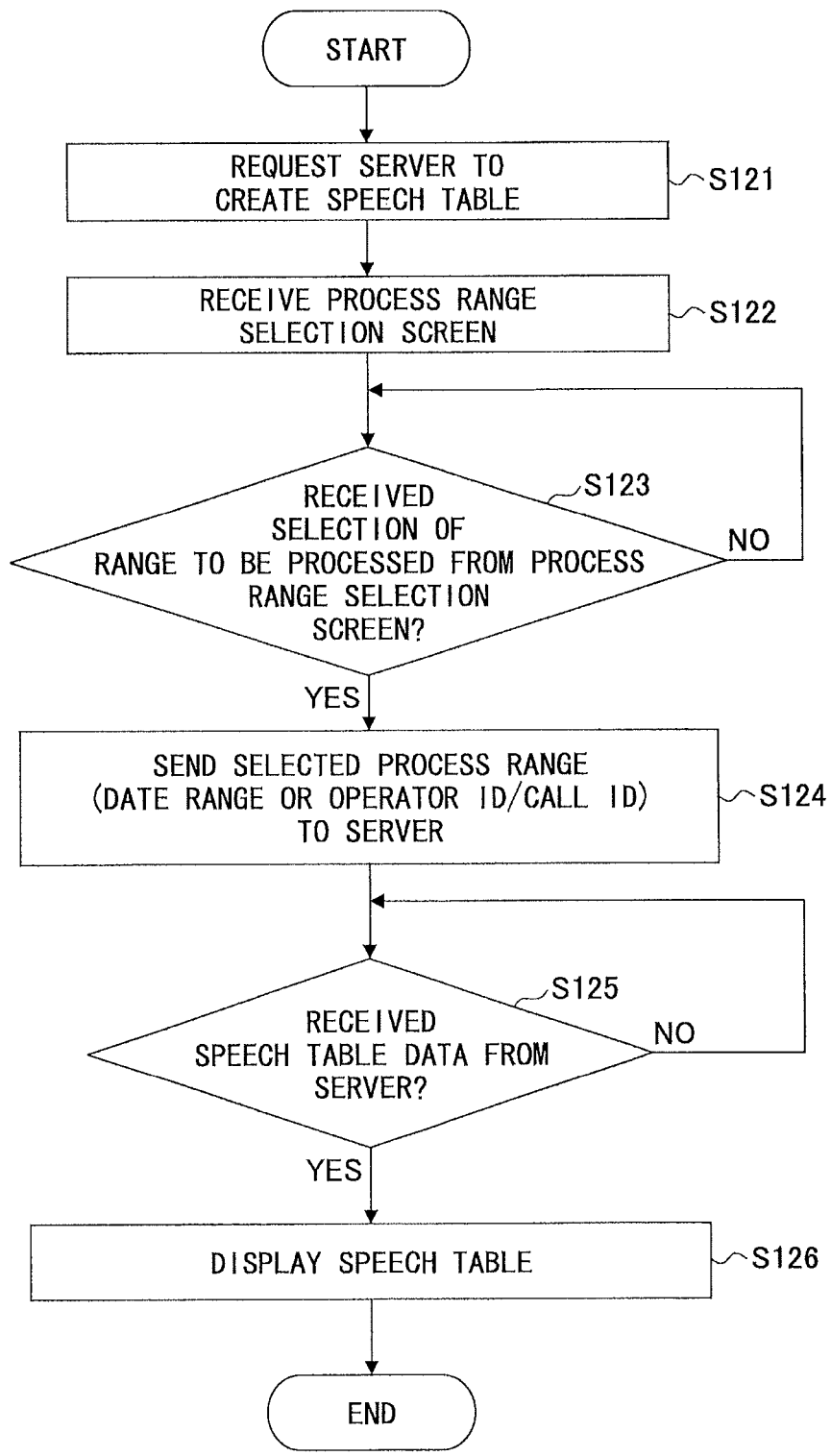
FIG. 25 is a flowchart of a process performed by the administrator terminal.

FIG. 25 is a flowchart of a process performed by the administrator terminal 3. In step S121, the OP evaluation request unit 131 of the administrator terminal 3 requests the server 1 to create a speech table. In step S122, the OP evaluation request unit 131 receives the process range selection screen 200 from the administrator terminal 3.

In step S123, the OP evaluation request unit 131 displays the process range selection screen 200 and prompts the administrator to input selection information of the process range. Until the OP evaluation request unit 131 determines that selection information of the process range is input by the administrator, the process of step S123 is repeated.

When selection information of the process range is input from the administrator, in step S124, the OP evaluation request unit 131 sends selection information of the process range (specification of call ID or specification of condition (date range or operator ID)) to the server 1. The OP evaluation information receiving unit 132 repeats the process of step S125 until the data of the speech table 300 is received from the server 1. Then, when the data of the speech table 300 is received from the server 1, in step S126, the OP evaluation information displaying unit 133 displays the speech table 300 on the display device 71.

As described above, the server 1 according to the present embodiment may create the speech table 300 as illustrated in FIG. 22 and send the speech table 300 to the administrator terminal 3. The speech table 300 displays, in a graph indicating the speech time periods of the operator and the customer, the problematic speech 301 with hatched lines so as to be identified, among the speeches of the operator overlapping the speeches of the customer. Furthermore, the speech table 300 displays the evaluation point of the call, the operator name, the superposition time, and the problematic superposition frequency.

Among the speeches of the operator overlapping the speeches of the customer, the problematic speech 301 displayed in the speech table 300 is determined as an overlapping speech of an operator followed by a customer's speech in which the customer is excited or annoyed. The customer may be determined as being excited or annoyed by using the sound quality (volume, pitch, etc.) of the speech of the customer.

For example, when the average volume in the speech of the customer following an overlapping speech of an operator is higher than that of a previous speech of the customer, it is determined that the overlapping speech of the operator is a problematic speech. As described above, by the server 1 according to the present embodiment, when an operator's speech overlaps the customer's speech, by determining whether the customer is annoyed by confirming the sound quality of the customer speech after the overlap, it is possible to exclude speeches of the operator that are not to be evaluated as having low quality, so that the evaluation of the call quality of the operator is performed with high precision.

According to an aspect of the embodiments, an operator evaluation support device and an operator evaluation support method are provided, by which the call quality of the operator is evaluated with high precision.

The speech recording unit corresponds to the speech time DB 12. The superposition identifying unit corresponds to the superpose time acquiring unit 111. The problematic superposition identifying unit corresponds to the OP evaluation unit 110. The call information creating unit corresponds to the OP evaluation unit 110. The sending unit corresponds to the evaluation information sending unit 109. The operator evaluation support program corresponds to the OP evaluation program 22.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An operator evaluation support device comprising:
a speech recording unit configured to record speech times of a customer and an operator during a telephone call from the customer to which the operator attends;
a superposition identifying unit configured to refer to the speech recording unit and identify a superposition speech, which is a speech of the operator that has started during a speech of the customer, during the telephone call;
a problematic superposition identifying unit configured to identify a problematic superposition speech among the superposition speeches, by comparing a sound quality of a speech of the customer that has started after the superposition speech with a standard sound quality;
a call information creating unit configured to refer to the speech recording unit and create telephone call information indicating the identified problematic superposition speech during the telephone call; and
a sending unit configured to send the created telephone call information to an administrator terminal used by an administrator who is evaluating the operator.

2. The operator evaluation support device according to claim 1, wherein
the speech recording unit is configured to record an average-volume-in-speech in association with the speech time of the customer, and
the problematic superposition identifying unit is configured to acquire, from the speech recording unit, the average-volume-in-speech of the speech of the customer that has started after the superposition speech, compare the average-volume-in-speech of the speech of the customer that has started after the superposition speech with a standard average volume, and identify the superposition speech as the problematic superposition speech when the average-volume-in-speech of the speech of the customer that has started after the superposition speech is higher than the standard average volume.

3. The operator evaluation support device according to claim 2, wherein
the problematic superposition identifying unit is configured to refer to the speech recording unit with respect to the telephone call, calculate an average value of the average-volume-in-speeches of the customer, and set the average value as the standard average volume.

4. The operator evaluation support device according to claim 1, wherein
the call information creating unit is configured to include, in the telephone call information, an evaluation point of the telephone call based on a superposition time and a superposition frequency of the problematic superposition speech.

5. An operator evaluation support method executed by a computer, the operator evaluation support method comprising:
referring to a speech recording unit recording speech times of a customer and an operator during a telephone call from the customer to which the operator attends, and identifying a superposition speech, which is a speech of the operator that has started during a speech of the customer, during the telephone call;
identifying a problematic superposition speech among the superposition speeches, by comparing a sound quality of a speech of the customer that has started after the superposition speech with a standard sound quality;
referring to the speech recording unit and creating telephone call information indicating the identified problematic superposition speech during the telephone call; and
sending the created telephone call information to an administrator terminal used by an administrator who is evaluating the operator.

6. The operator evaluation support method according to claim 5, further comprising:
referring to the speech recording unit recording an average-volume-in-speech in association with the speech time of the customer, acquiring the average-volume-in-speech of the speech of the customer that has started after the superposition speech from the speech recording unit, comparing the average-volume-in-speech of the speech of the customer that has started after the superposition speech with a standard average volume, and identifying the superposition speech as the problematic superposition speech when the average-volume-in-speech of the speech of the customer that has started after the superposition speech is higher than the standard average volume.

7. The operator evaluation support method according to claim 6, further comprising:
referring to the speech recording unit with respect to the telephone call, calculating an average value of the average-volume-in-speeches of the customer, and setting the average value as the standard average volume.

8. The operator evaluation support method according to claim 5, further comprising:
including, in the telephone call information, an evaluation point of the telephone call based on a superposition time and a superposition frequency of the problematic superposition speech.

9. A non-transitory computer-readable recording medium storing an operator evaluation support program that causes a computer to execute a process comprising:
referring to a speech recording unit recording speech times of a customer and an operator during a telephone call from the customer to which the operator attends, and identifying a superposition speech, which is a speech of the operator that has started during a speech of the customer, during the telephone call;
identifying a problematic superposition speech among the superposition speeches, by comparing a sound quality of a speech of the customer that has started after the superposition speech with a standard sound quality;
referring to the speech recording unit and creating telephone call information indicating the identified problematic superposition speech during the telephone call; and
sending the created telephone call information to an administrator terminal used by an administrator who is evaluating the operator.

10. The non-transitory computer-readable recording medium according to claim 9, the process further comprising:
referring to the speech recording unit recording an average-volume-in-speech in association with the speech time of the customer, acquiring the average-volume-in-speech of the speech of the customer that has started after the superposition speech from the speech recording unit, comparing the average-volume-in-speech of the speech of the customer that has started after the superposition speech with a standard average volume, and identifying the superposition speech as the problematic superposition speech when the average-volume-in-speech of the speech of the customer that has started after the superposition speech is higher than the standard average volume.

11. The non-transitory computer-readable recording medium according to claim 10, the process further comprising:
referring to the speech recording unit with respect to the telephone call, calculating an average value of the average-volume-in-speeches of the customer, and setting the average value as the standard average volume.

12. The non-transitory computer-readable recording medium according to claim 9, the process further comprising:
including, in the telephone call information, an evaluation point of the telephone call based on a superposition time and a superposition frequency of the problematic superposition speech.

* * * * *